(12) United States Patent
Toyama et al.

(10) Patent No.: US 8,559,807 B2
(45) Date of Patent: Oct. 15, 2013

(54) CAMERA SYSTEM AND LENS BARREL

(71) Applicant: Olympus Imaging Corp., Tokyo (JP)

(72) Inventors: Mitsuru Toyama, Hidaka (JP); Takeshi Ito, Hino (JP); Tamotsu Koiwai, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/759,790

(22) Filed: Feb. 5, 2013

(65) Prior Publication Data
US 2013/0163975 A1 Jun. 27, 2013

Related U.S. Application Data

(63) Continuation of application No. PCT/JP2012/060441, filed on Apr. 18, 2012.

(30) Foreign Application Priority Data

Jun. 8, 2011 (JP) ................................. 2011-128617

(51) Int. Cl.
G03B 3/00 (2006.01)
G03B 13/00 (2006.01)
G02B 7/04 (2006.01)

(52) U.S. Cl.
USPC ............ 396/137; 396/144; 396/147; 359/825

(58) Field of Classification Search
USPC .................... 396/137, 144, 147, 85; 348/345; 359/825
See application file for complete search history.

(56) References Cited

U.S. PATENT DOCUMENTS

| 3,161,119 | A | * | 12/1964 | Mahn | .............................. 396/144 |
| 5,164,860 | A | | 11/1992 | Suzuki et al. | |
| 5,918,078 | A | | 6/1999 | Imura et al. | |
| 7,792,422 | B2 | * | 9/2010 | Mori | .............................. 396/144 |
| 2012/0327274 | A1 | * | 12/2012 | Taguchi et al. | ............. 348/240.2 |
| 2012/0328276 | A1 | * | 12/2012 | Toyama et al. | ............... 359/825 |

FOREIGN PATENT DOCUMENTS

| JP | 03-236008 | 10/1991 |
| JP | 06-011643 | 1/1994 |
| JP | 06-265771 | 9/1994 |
| JP | 10-082944 | 3/1998 |
| JP | 2010-002823 | 1/2010 |
| JP | 2011-090023 | 5/2011 |

OTHER PUBLICATIONS

Office Action for Japanese Patent Application No. 2012-530816, mailed Sep. 4, 2012 (3 pgs.) with translation (3 pgs.).
PCT/ISA/210, "International Search Report" for PCT/JP2012/060441, mailed Jun. 12, 2012 (2 pgs.) with partial translation (2 pgs.).

* cited by examiner

*Primary Examiner* — Christopher Mahoney
(74) *Attorney, Agent, or Firm* — John C. Pokotylo; Straub & Pokotylo

(57) ABSTRACT

A lens barrel of the present invention includes: a first barrel; a second barrel capable of relative rotation around an optical axis with respect to the first barrel; a focusing lens; a drive portion that drives the focusing lens; a rotational operation member that can move in the optical axis direction to a first position, and a second position; and an engagement portion that, when the rotational operation member is at the second position, causes the second barrel and the rotational operation member to engage with each other and rotates the second barrel accompanying rotation of the rotational operation member, and when the rotational operation member is at the first position, disengages the second barrel and the rotational operation member from each other.

18 Claims, 19 Drawing Sheets

CAMERA SYSTEM AND LENS BARREL

CROSS REFERENCE TO RELATED APPLICATION

This application is a continuation application of PCT/JP2012/060441 filed on Apr. 18, 2012 and claims benefit of Japanese Application No. 2011-128617 filed in Japan on Jun. 8, 2011, the entire contents of which are incorporated herein by this reference.

BACKGROUND OF THE INVENTION

1. Field of the Invention

The present invention relates to a camera system in which an autofocus operation is possible, and a lens barrel that is used in the camera system.

2. Description of the Related Art

Camera systems in which a manual focus operation and an autofocus operation are possible mainly adopt a configuration that includes a rotatable rotational operation member on a lens barrel, and in which a focusing distance is changed in accordance with rotation of the rotational operation member at the time of a manual focus operation, and the focusing distance is changed by a motor at the time of an autofocus operation.

For example, Japanese Patent Application Laid-Open Publication No. 6-11643 discloses a lens barrel in which it is possible that a rotational operation member does not rotate at a time of autofocusing, and a focusing operation is performed in accordance with rotation of the rotational operation member at a time of manual focusing.

Furthermore, the lens barrel disclosed in Japanese Patent Application Laid-Open Publication No. 6-11643 has a configuration that includes a rotatable display member on which a distance scale that displays focusing distances is provided, and in which the display member is rotated so that a distance displayed by the distance scale and a focusing distance correspond.

SUMMARY OF THE INVENTION

A lens barrel according to one aspect of the present invention includes: a first barrel; a second barrel that is capable of relative rotation around an optical axis with respect to the first barrel; a drive source; a focusing lens; a drive portion that is driven by the drive source, and that drives the focusing lens in an optical axis direction; a rotational operation member that is a member operated for driving the focusing lens in the optical axis direction, and that can move in the optical axis direction to a first position at which the rotational operation member covers the second barrel and to a second position at which the rotational operation member causes the second barrel to be exposed to outside, and which is configured to be capable of rotation around the optical axis at the first position and the second position, respectively; and engagement means that, when the rotational operation member is at the second position, causes the second barrel and the rotational operation member to engage with each other and rotates the second barrel accompanying rotation of the rotational operation member, and when the rotational operation member is at the first position, disengages the second barrel and the rotational operation member from each other; wherein when the rotational operation member is at the first position, the drive portion drives the focusing lens in accordance with rotation of the rotational operation member, and when the rotational operation member is at the second position, the drive portion drives the focusing lens in accordance with rotation of the second barrel that is engaged with the rotational operation member.

A camera system according to one aspect of the present invention includes: a first barrel; a second barrel that is capable of relative rotation around an optical axis with respect to the first barrel; a drive source; a focusing lens; a drive portion that is driven by the drive source, and that drives the focusing lens in an optical axis direction; a rotational operation member that is a member operated for driving the focusing lens in the optical axis direction, and that can move in the optical axis direction to a first position at which the rotational operation member covers the second barrel and to a second position at which the rotational operation member causes the second barrel to be exposed to outside, and which is configured to be capable of rotation around the optical axis at the first position and the second position, respectively; and engagement means that, when the rotational operation member is at the second position, causes the second barrel and the rotational operation member to engage with each other and rotates the second barrel accompanying rotation of the rotational operation member, and when the rotational operation member is at the first position, disengages the second barrel and the rotational operation member from each other; wherein when the rotational operation member is at the first position, the drive portion drives the focusing lens in accordance with rotation of the rotational operation member, and when the rotational operation member is at the second position, the drive portion drives the focusing lens in accordance with rotation of the second barrel that is engaged with the rotational operation member.

DETAILED DESCRIPTION OF THE PREFERRED EMBODIMENTS

Figure 1:
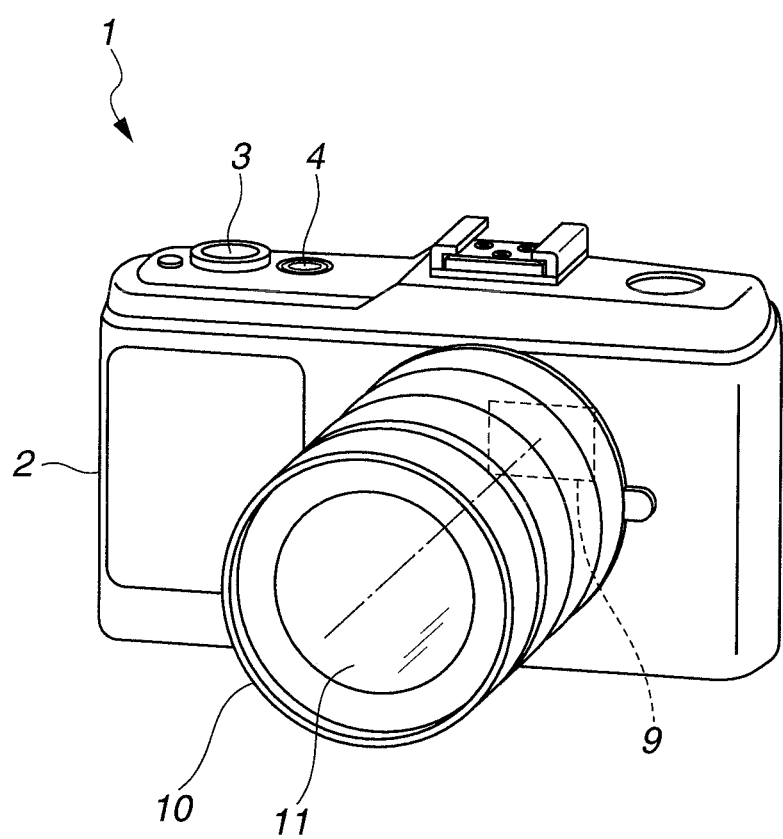
FIG. 1 is a perspective view showing a front face side of a camera constituting a camera system.

Preferred embodiments of the present invention are described hereunder with reference to the drawings. It should be noted that each of the components in the drawings referred to in the following description is displayed in a different contraction scale so as to be shown in a size that is recognizable in the drawings. Further, the present invention is not limited to only the quantity of components, the shapes of components, the ratios between the sizes of components, and the relative positional relationship between the respective components described in the drawings.

First Embodiment

As shown in FIG. 1, a camera system 1 of the present embodiment includes a camera body 2 and a lens barrel 10 as an interchangeable lens. The lens barrel 10 holds an optical system member 11 for forming an object image. As one example according to the present embodiment, the camera system 1 has a form in which the camera body 2 and the lens barrel 10 can be detachably attached to each other. Note that the camera system 1 may also have a form in which the camera body and the lens barrel are integrated.

Further, as one example according to the present embodiment, the camera system 1 has a configuration referred to as a so-called "electronic camera" or "digital camera" or the like, in which an image pickup device 9 is provided in the camera body 2 and which electronically picks up an object image and records the image. The image pickup device 9 outputs, at a predetermined timing, an electrical signal in accordance with light incident on a light-receiving surface (pixel region). For example, the image pickup device 9 has the form of a charge coupled device (CCD), a CMOS (complementary metal-oxide semiconductor) sensor or the like.

The camera system 1 is configured so as to enable an autofocus operation (automatic focus operation). An autofocus sensor portion that is used for an autofocus operation is arranged in the camera body 2. As one example according to the present embodiment, the camera system 1 is configured so as to perform an autofocus operation according to a so-called "contrast detection method" in which a contrast value of an object image is detected based on a signal that is outputted from the image pickup device 9, and focusing control of the optical system member 11 is performed so that the contrast value becomes the maximum value. That is, in the camera system 1 of the present embodiment, the image pickup device 9 is an autofocus sensor portion.

Note that the camera system 1 may also be configured to perform an autofocus operation according to a so-called "phase difference detection method". In this case, a sensor that detects a phase difference of an object image that is arranged in the camera body 2 serves as an autofocus sensor portion. Further, the autofocus sensor portion may be a distance measuring sensor of a different form or the like.

A release switch 3 that a user uses to input an instruction to perform an image pickup operation, and a power switch 4 that a user uses to input an instruction to perform an operation to turn the power supply of the camera body 2 on and off are arranged on the top face portion of the camera body 2.

According to the present embodiment, the release switch 3 is a push-button type switch that includes two release switches, namely, a first release switch 3a and a second release switch 3b, that enter an "on" state in response to two different stroke amounts (depression amounts).

When a so-called "half-stroke operation" is performed in which the release switch 3 is depressed by an amount that is a partial amount of a full stroke amount, the first release switch 3a enters an "on" state. When a so-called "full-stroke operation" is performed in which the release switch 3 is depressed further than in the half-stroke operation, the second release switch 3b enters an "on" state. When the second release switch 3b enters an "on" state, the camera system 1 executes an image pickup operation and stores the image.

Note that the release switch 3 may be of a form in which the first release switch 3a and the second release switch 3b are arranged at separated positions. Further, the release switch 3 is not limited to the form of a push-button type switch, and may be a switch of another form such as a touch sensor.

Although not shown in the drawings, a focus mode switching operation portion 5 for inputting an instruction to switch a mode of a focusing operation of the camera system 1 is arranged on the camera body 2. By operating the focus mode switching operation portion 5, a user selects either one of an autofocus operation mode that performs an autofocus operation and a manual focus operation mode that performs a manual focus operation as the focus operation mode of the camera system 1. Operations of the camera system 1 in the autofocus operation mode and in the manual focus operation mode are described later.

Note that the focus mode switching operation portion 5 is not limited to the form of a button switch, and may be a touch sensor or a dial switch or the like. The camera body 2 also includes an image display apparatus, and a form may also be adopted in which a user switches the focus operation mode by selecting, through a button switch or a touch sensor, a menu displayed on the image display apparatus. A form may also be adopted in which the focus mode switching operation portion 5 is arranged on the lens barrel 10.

Although not shown in the drawings, a battery housing portion that houses a primary battery or a secondary battery for supplying power to the camera system 1, and a storage media housing portion that houses a flash memory for storing images are provided in the camera body 2.

According to the present embodiment, the camera body 2 and the lens barrel 10 can be detachably attached to each other by means of an engagement mechanism that is generally referred to as a "bayonet mount". Note that, in the camera system 1, a configuration that makes the camera body 2 and the lens barrel 10 detachably attachable to each other is not limited to the present embodiment and, for example, a configuration that is generally referred to as a "screw-type mount" that uses a screw mechanism may be adopted. Further, a configuration may be adopted that makes the camera body 2 and the lens barrel 10 detachably attachable to each other by means of a mechanism that fits the camera body 2 and the lens barrel 10 together or uses a magnet or the like.

The lens barrel 10 includes a base portion 12, a fixed barrel (first barrel) 14, a focusing barrel 13, a drive portion 15, an indicator display barrel 16, a display member (second barrel, distance display ring, distance display means) 18, and a rotational operation member (operation member, rotational operation ring, rotational operation means, rotational operation portion) 17. Note that the display member 18 is mainly constituted by a first cylindrical member that has a cylindrical shape, and also includes a thin second cylindrical member that is shorter than the first cylindrical member in the axial direction that is fitted to the outer circumference thereof and fixed thereto. A distance scale 18a that is described later is displayed on the outer circumference of the second cylindrical member. Hereunder, the display member 18 is described as a member in which the first cylindrical member and the second cylindrical member are integrated.

Figure 2:
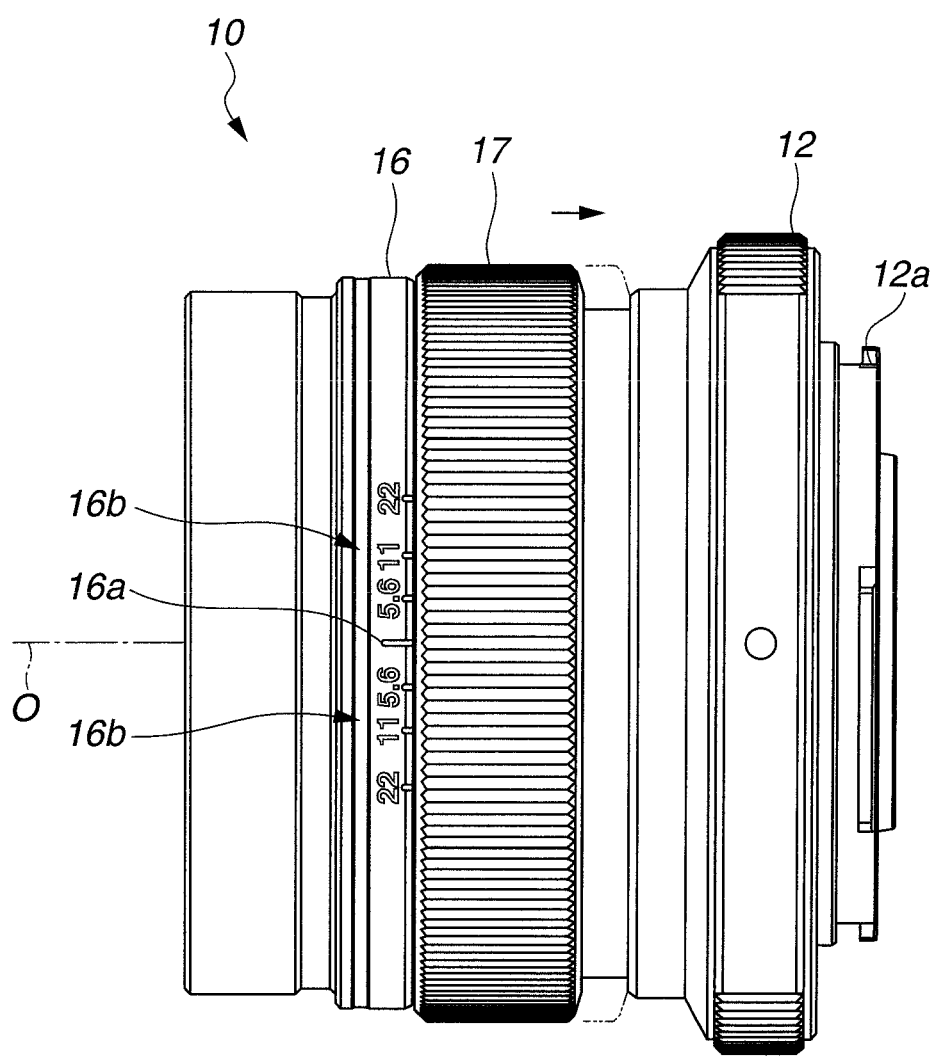
FIG. 2 is a top face view of a lens barrel in a state where a rotational operation member is positioned at a first position.

As shown in FIG. 2, the base portion 12 has a bayonet portion 12a that engages with the camera body 2. The base portion 12 is fixed to the camera body 2 by the bayonet portion (bayonet claw) 12a engaging with the camera body 2.

Figure 4:
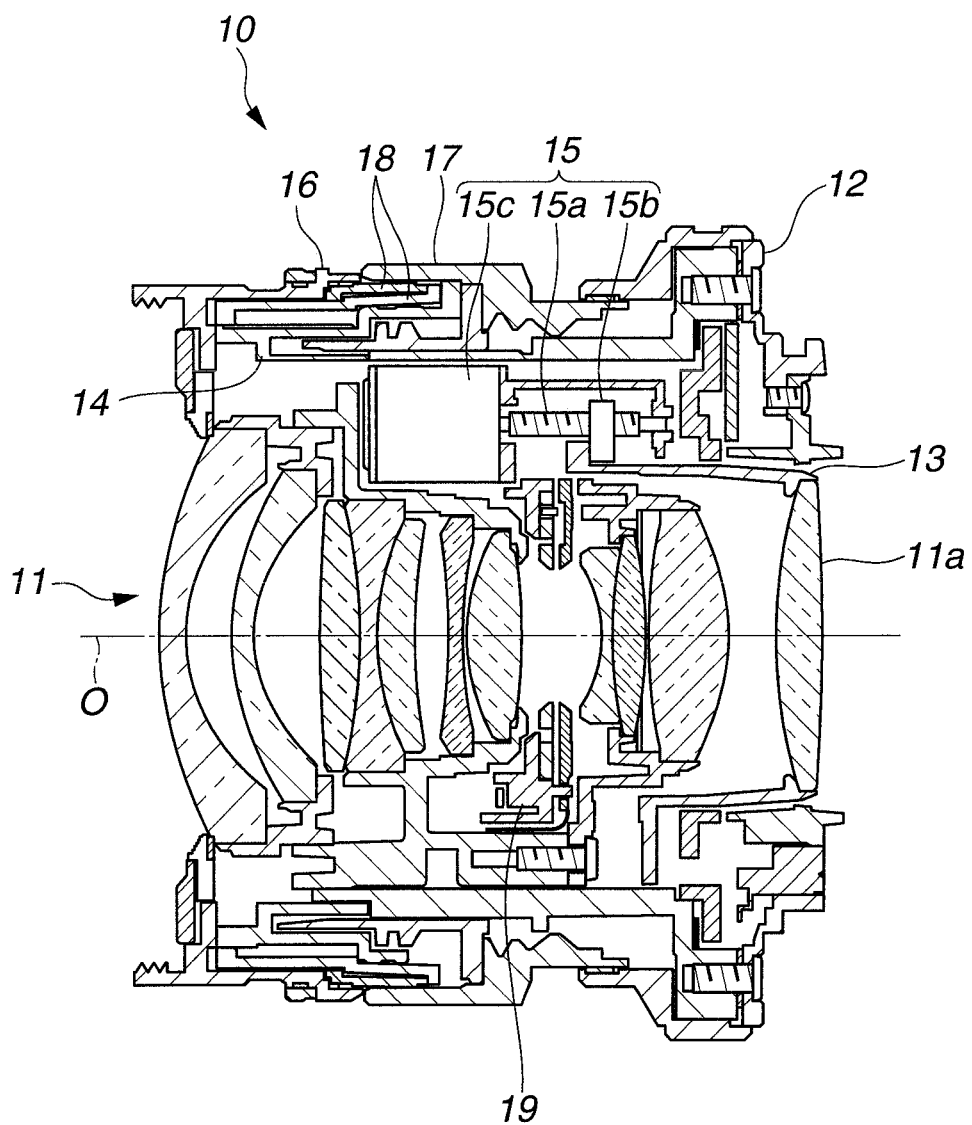
FIG. 4 is a cross-sectional view of the lens barrel.

As shown in FIG. 4, the lens barrel 10 has a mechanism that holds an optical system member 11 that includes a plurality of lens and the like as an image pickup optical system with respect to the base portion 12. Note that the form of the optical system member 11 that the lens barrel 10 holds may be a form that includes a diaphragm, a prism, a mirror, a filter or the like in addition to lenses.

A configuration is adopted so that the focusing distance changes in accordance with relative movement of part or all of the optical system member (optical system elements and image pickup optical system) 11 in an optical axis O direction of the optical system member 11 with respect to the base portion 12. Here, the term "focusing distance change" refers to changing a distance to an object that an attempt is being made to focus on. The term also refers to changing a focus position on which the optical system member 11 is focused. Hereunder, among the elements of the optical system member 11, an element that moves in the optical axis O direction when changing the focusing distance is referred to as a focusing lens (focusing optical element, focusing optical system member) 11a.

Specifically, the optical system member 11 of the present embodiment includes a plurality of lenses and a diaphragm mechanism portion 19 that are arranged along the optical axis O. According to the present embodiment, a lens that is arranged at the most rearward position (image side) among the plurality of lens of the optical system member 11 is the focusing lens 11a.

The focusing lens 11a is held by the focusing barrel 13 that is arranged so as to be moveable forward and rearward in the optical axis O direction relative to the base portion 12. The focusing barrel 13 is driven in the optical axis O direction by the drive portion 15.

Although the configuration of the drive portion 15 is not particularly limited, according to the present embodiment, the drive portion 15 includes a screw 15a arranged substantially parallel to the optical axis O, a drive source (motor) 15c that rotates the screw 15a, and a nut 15b that is screwed together with the screw 15a. According to the present embodiment, the drive source 15c is a stepping motor. The rotation around the screw 15a of the nut 15b is restricted, and the nut 15b moves substantially parallel to the optical axis O accompanying rotation of the screw 15a. The focusing barrel 13 is engaged with the nut 15b so as to follow the nut 15b.

The drive portion 15 drives the focusing barrel 15 in the optical axis O direction by rotating the screw 15a by means of the drive source 15c. Note that the configuration of the drive portion 15 is not limited to the present embodiment, and may be another form such as a linear motor. In addition, the drive portion 15, for example, may have a configuration in which some constituent members, such as the drive source, are arranged inside the camera body 2.

Elements other than the focusing lens 11a of the optical system member 11 are held by a fixed barrel 14 as a first barrel whose position with respect to the base portion 12 is fixed.

Note that, although elements other than the focusing lens 11a of the optical system member 11 are held by the fixed barrel 14 because the lens barrel 10 of the present embodiment has the form of a so-called "fixed focal length lens" in which the focal distance is fixed, it goes without saying that in a case where the lens barrel 10 is a so-called "collapsible lens barrel" in which the entire length can be expanded and contracted or a case where the lens barrel 10 is a so-called "zoom lens" or "varifocal lens" in which a focal distance can be changed, members other than the focusing lens 11a of the optical system member 11 are also held by a barrel member that moves relatively with respect to the base portion 12.

The rotational operation member 17, the indicator display barrel 16 and the display member 18 are arranged on the outer circumferential portion of the lens barrel 10.

The rotational operation member 17 is a substantially cylindrical member that is arranged so as to be rotatable around the optical axis O of the optical system member 11 on the outer circumferential portion of the lens barrel 10, and also to be movable forward and rearward in the optical axis O direction. At least one part of the rotational operation member 17 is exposed on the outer circumferential face of the lens barrel 10, and is arranged so that a finger of a user of the camera system 1 engages therewith.

Figure 5:
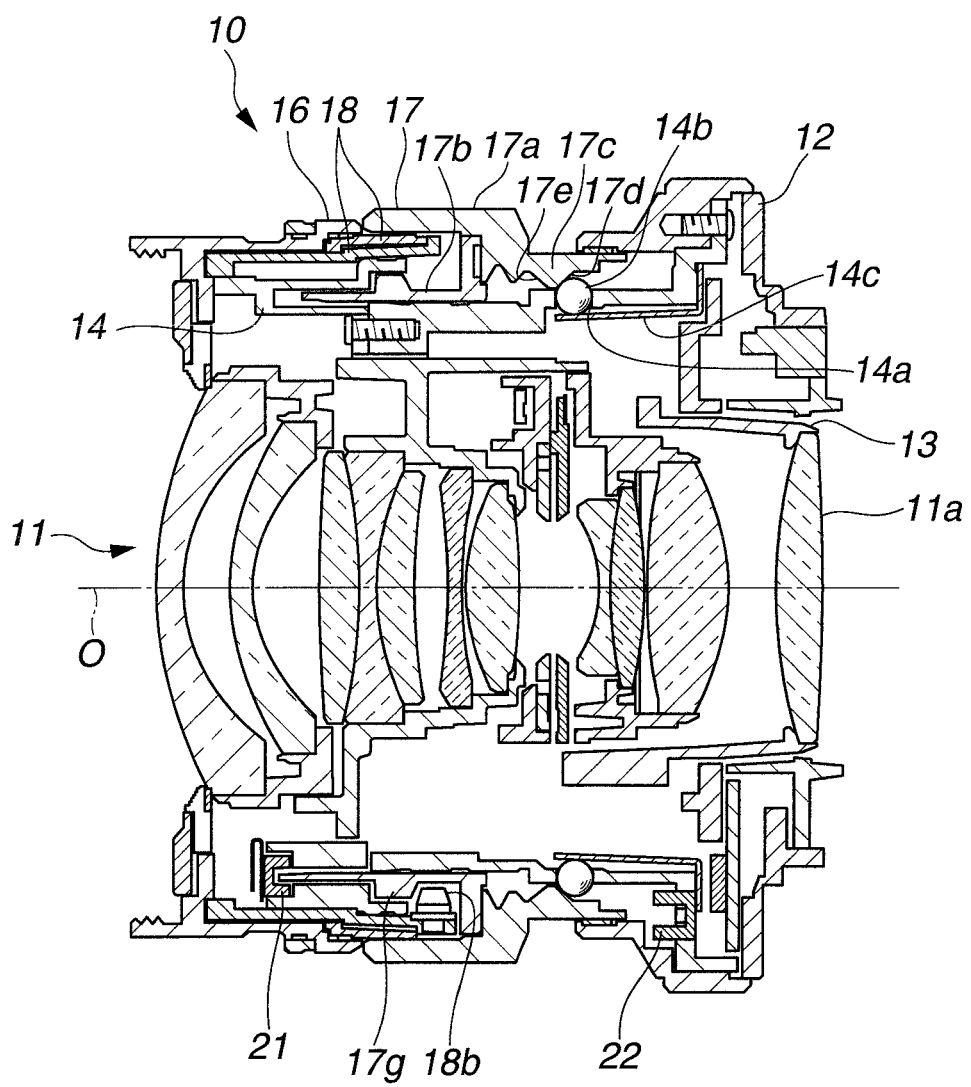
FIG. 5 is a cross-sectional view of the lens barrel in a state where the rotational operation member is positioned at the first position.
Figure 6:
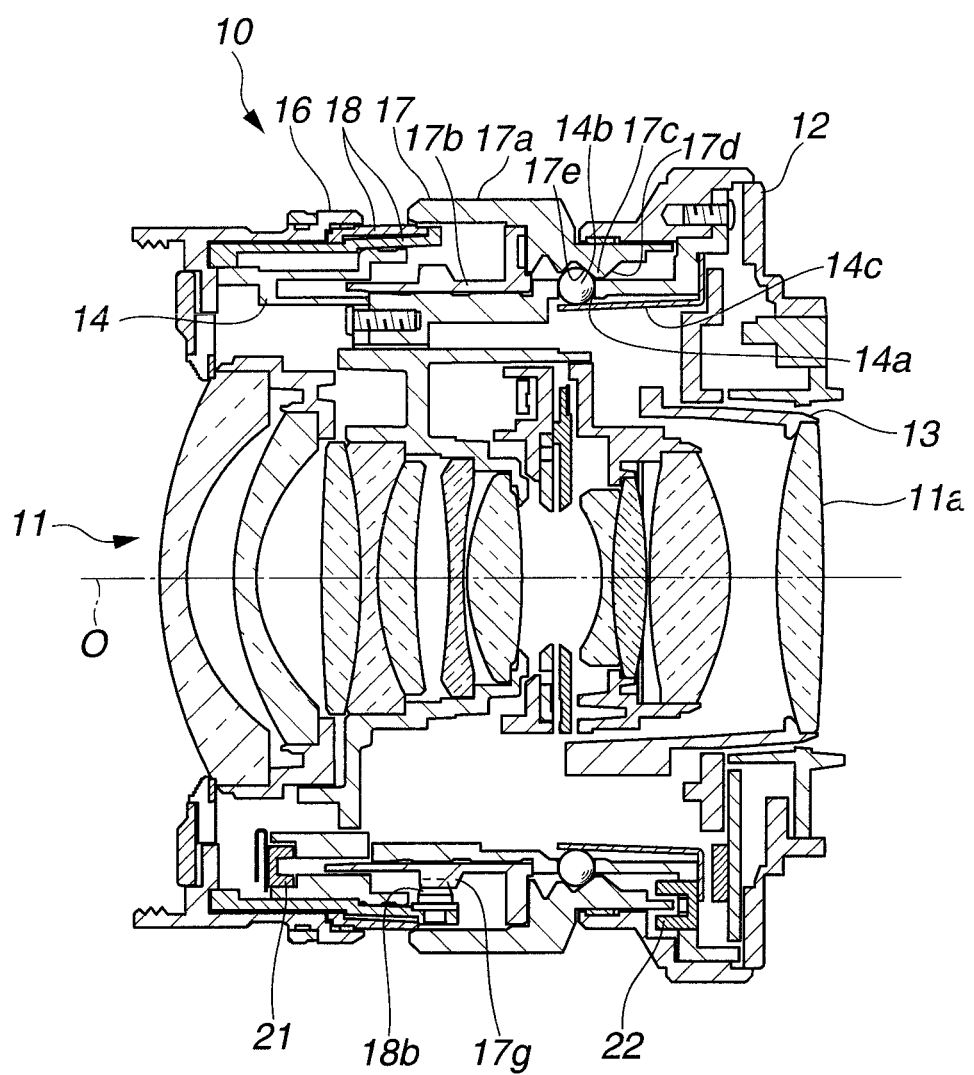
FIG. 6 is a cross-sectional view of the lens barrel in a state where the rotational operation member is positioned at the second position.
Figure 7:
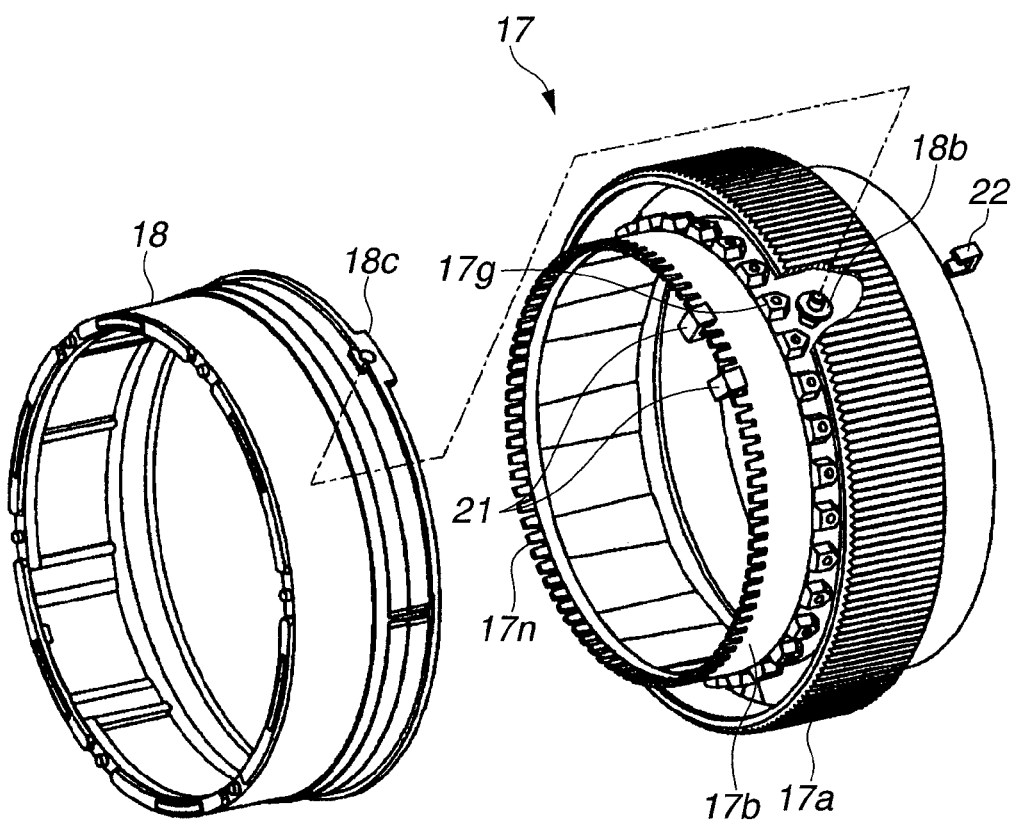
FIG. 7 is an exploded perspective view illustrating a state where engagement between the rotational operation member and a display member has been released.
Figure 8:
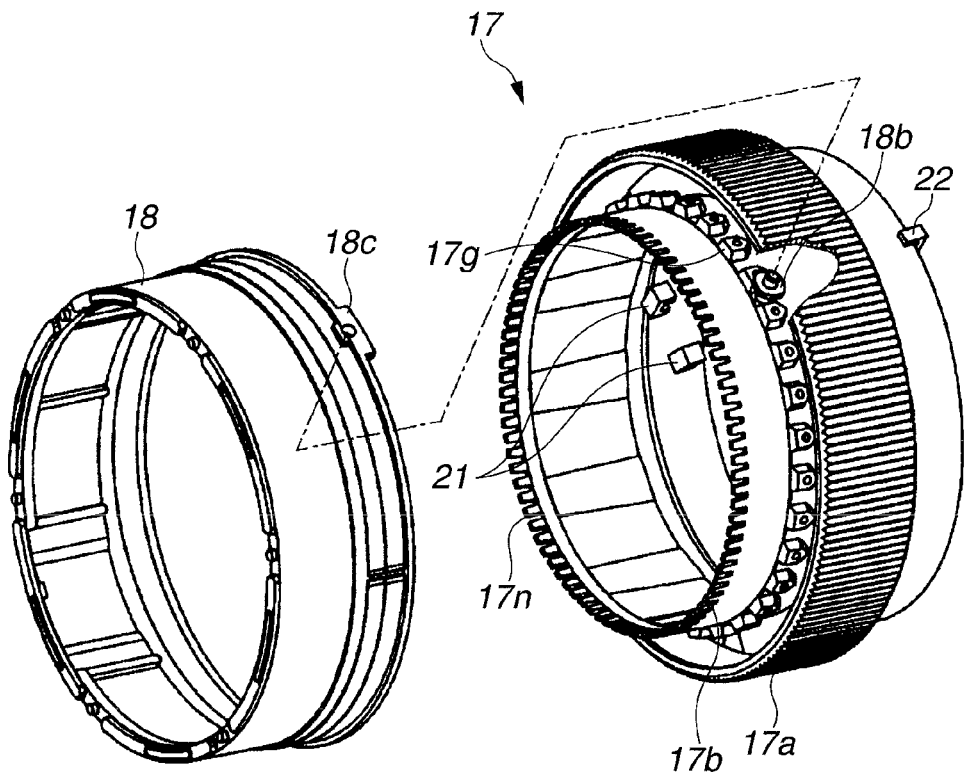
FIG. 8 is an exploded perspective view illustrating a state where the rotational operation member and the display member are engaged.

Specifically, according to the present embodiment, as shown in the cross-sectional views of FIG. 5 and FIG. 6 and in the perspective views of FIG. 7 and FIG. 8, the rotational operation member 17 includes two substantially cylindrical areas, namely, a substantially cylindrical operation portion 17a that is exposed on the outer circumferential face of the lens barrel 10 and in which projections and depressions are provided on an outer circumferential portion so that a finger of a user engages therewith and an inside cylindrical portion (engagement barrel) 17b that is substantially cylindrical and is arranged on the inner side of the operation portion 17a with a predetermined clearance therebetween.

Note that, according to the present embodiment illustrated in the drawings, although the rotational operation member 17 is constituted by the operation portion 17a and the inside cylindrical portion 17b that are separate members which are, for example, fixed by screws or an adhesive, a form may also be adopted in which the operation portion 17a and the inside cylindrical portion 17b are formed integrally with each other.

Figure 3:
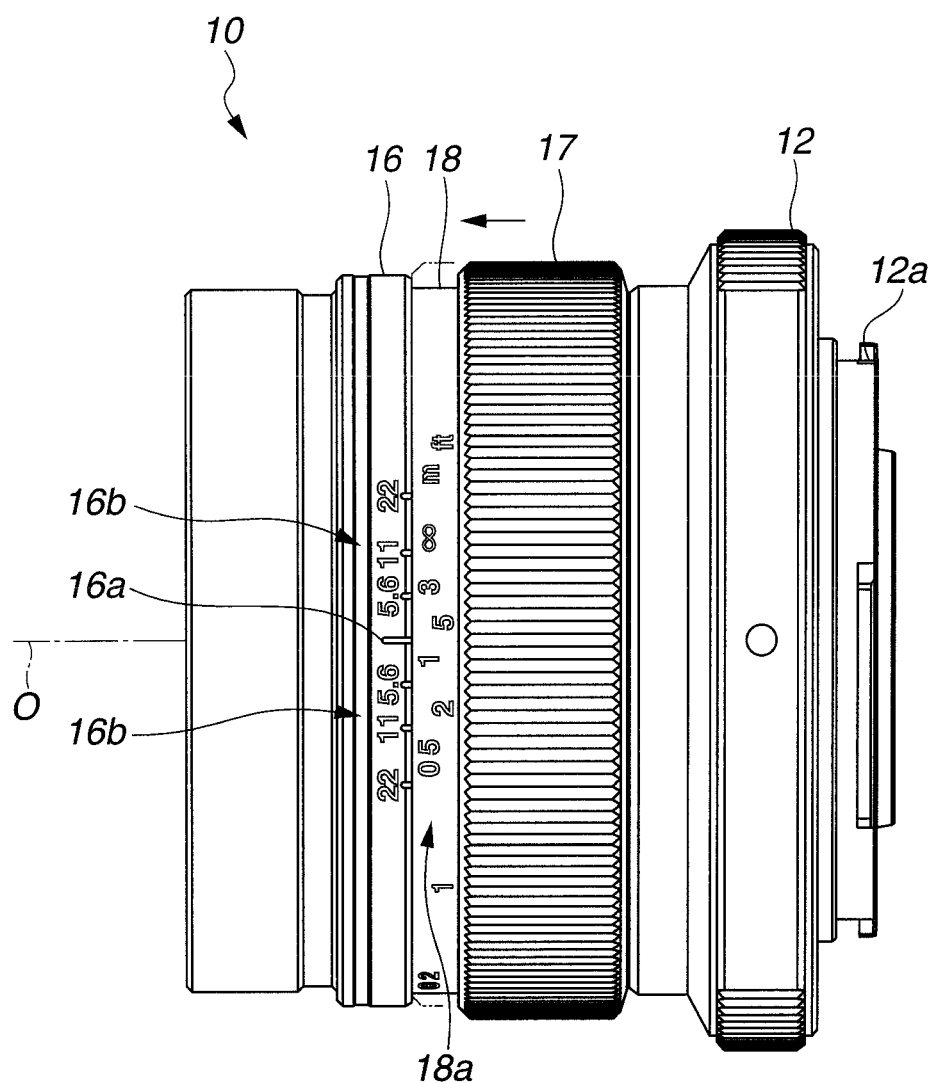
FIG. 3 is a top face view of the lens barrel in a state where the rotational operation member is positioned at a second position.

The rotational operation member 17 rotates around the optical axis O by means of a force applied to the operation portion 17a by fingers of the user. As shown in FIG. 2 and FIG. 3, the rotational operation member 17 is moveable within a predetermined range in the optical axis O direction, and is arranged so as to be selectively positioned at either one of two ends of the moving range in a state in which a force is not being applied thereto from outside. The rotational operation member 17 can be moved back and forth from one end to the other end of the moving range and from the other end to the one end thereof in the optical axis O direction by a force applied to the operation portion 17a by fingers of the user.

Hereunder, among the two positions at which the rotational operation member 17 is selectively positioned, an end portion on the front side (object side) of the moving range in the optical axis O direction is referred to as a "first position" and an end portion on the rear side (image side) of the moving range is referred to as a "second position".

That is, FIG. 2, FIG. 4, FIG. 5 and FIG. 7 illustrate a state in which the rotational operation member 17 is positioned at the first position, while FIG. 3, FIG. 6 and FIG. 8 illustrate a state in which the rotational operation member 17 is positioned at the second position.

As shown in FIG. 5 and FIG. 6, on an inner circumferential face of the rotational operation member 17, a convex portion 17c that protrudes to the inner side in the diameter direction and has a cross-section that is a substantially triangular shape is formed across the entire circumference in the circumferential direction. The convex portion 17c includes a first inclined face portion 17d and a second inclined face portion 17e. The first inclined face portion 17d is formed so that the inner diameter thereof decreases in accordance with proximity to the front along the optical axis O and reaches the apex of the triangular shape. The second inclined face portion 17e is formed so the inner diameter thereof increases in accordance with proximity to the front along the optical axis O from the apex of the triangular shape on the front side of the first inclined face portion 17d.

A through-hole 14a is formed at a location facing the convex portion 17c in the fixed barrel 14 that is arranged on the inner side of the rotational operation member 17. A ball 14b is loosely fitted inside the through-hole 14a. The ball 14b can protrude further to the outside than the outer circumferential face of the fixed barrel 14, and is urged towards the outer side in the diameter direction of the fixed barrel 14 by an urging member 14c that is a plate spring. A spring portion (plate spring) of the urging member 14c is disposed on the inner circumferential face of the fixed barrel 14. The urging member 14c and the ball 14b are arranged at a plurality of places in the circumferential direction.

When the rotational operation member 17 is positioned at the first position, the ball 14b contacts against the first inclined face portion 17d of the convex portion 17c, and when the rotational operation member 17 is positioned at the second position, the ball 14b contacts against the second inclined face portion 17e of the convex portion 17c. Because the convex portion 17c has a substantially triangular cross-section, irrespective of the position of the rotational operation member 17, the ball 14b is always contacting against either one of the first inclined face portion 17d and the second inclined face portion 17e.

Accordingly, when the rotational operation member 17 is situated towards the front of the moveable range, the rotational operation member 17 is urged frontward by the ball 14b that contacts against the first inclined face portion 17d, and contacts against one end of the moveable range at the first position and is thereby positioned at the first position.

On the other hand, when the rotational operation member 17 is situated towards the rear of the moveable range, the rotational operation member 17 is urged rearward by the ball 14b that contacts against the second inclined face portion 17e, and contacts against the other end of the moveable range at the second position and is thereby positioned at the second position.

Therefore, in the lens barrel 10 of the present embodiment, when an external force is not being applied to the rotational operation member 17, the position in the optical axis O direction of the rotational operation member 17 is either one of the first position and the second position. For example, in a state where the rotational operation member 17 is positioned at the first position, if an external force in the rearward direction that is applied to the rotational operation member 17 is weaker than an urging force that the urging member 14c and the ball 14b generate, when the external force disappears, the rotational operation member 17 returns to the first position. Further, for example, in a state where the rotational operation member 17 is positioned at the first position, if an external force in the rearward direction that is applied to the rotational operation member 17 is stronger than an urging force that the urging member 14c and the ball 14b generate, the rotational operation member 17 moves to the second position.

A first encoder portion (operation portion rotation detection portion, rotation detection means) 21 is also arranged in the lens barrel 10. The first encoder portion 21 is first encoder means that, at least when the rotational operation member 17 is positioned at the first position, detects a rotational direction and a rotational amount around the optical axis O of the rotational operation member 17. Further, an operation member position detection portion (position detection means) 22 that detects which one of the first position and the second position in the optical axis O direction the rotational operation member 17 is positioned at is arranged in the lens barrel 10.

The first encoder portion 21 detects, with a pair of photo-interrupters, passage of a plurality of slits (notches) 17n that are provided in the rotational operation member 17 at predetermined intervals in the circumferential direction. The first encoder portion 21 detects the rotational direction and the rotational amount of the rotational operation member 17 based on an output signal of the pair of photo-interrupters. The first encoder portion 21 and the slits 17n provided in the rotational operation member 17 of the present embodiment have the same form as a so-called "incremental-type rotary encoder".

More specifically, according to the present embodiment, as shown in FIG. 7, the slits 17n are formed in an end portion on a frontward side of the inside cylindrical portion 17b. As shown in FIG. 5 and FIG. 6, the pair of photo-interrupters constituting the first encoder portion 21 are fixed to the fixed barrel 14.

The end portion on the frontward side of the inside cylindrical portion 17b in which the slits 17n are formed is positioned within the detection range of the pair of photo-interrupters only when the rotational operation member 17 is positioned at the first position. Accordingly, the first encoder portion 21 of the present embodiment can detect the rotational direction and the rotational amount around the optical axis O of the rotational operation member 17 only in a case where the rotational operation member 17 is positioned at the first position.

Note that the form of the first encoder portion 21 is not limited to the present embodiment, and the first encoder portion 21 may be of any form that can detect the rotational direction and the rotational amount around the optical axis O of the rotational operation member 17 in at least a case where the rotational operation member 17 is positioned at the first position. For example, the first encoder portion 21 may have the form of a magnetic rotary encoder.

The operation member position detection portion 22 is constituted by a photo-interrupter that is fixed to the base portion 12 or the fixed barrel 14. The operation member position detection portion 22 is fixed to a position such that, when the rotational operation member 17 is positioned at the second position, part of the rotational operation member 17 advances to inside a detection range of the photo-interrupter.

Note that the form of the operation member position detection portion 22 is not particularly limited as long as the operation member position detection portion 22 has a configuration that can detect a position in the optical axis O direction of the rotational operation member 17. For example, the operation member position detection portion 22 may be a magnetic sensor or the like.

Further, engagement convex portions 17g constituting engagement means (engagement portion) are provided on the rotational operation member 17. The engagement convex portions 17g are portions for engaging with the display member 18, described later, when the rotational operation member 17 is positioned at the second position, and causing the rotational operation member 17 and the display member 18 to rotate integrally with each other.

The engagement convex portions 17g include a plurality of convex portions that protrude to the outer side in the diameter direction on the outer circumferential face of the inside cylindrical portion 17b. As shown in FIG. 7 and FIG. 8, the plurality of convex portions constituting the engagement convex portions 17g are spaced uniformly in the circumferential direction with a fixed gap therebetween. When viewed from the outer side in the diameter direction, the plurality of convex portions have a substantially V shape in which the width of a part on the rear side narrows towards the rear side.

The form of engagement between the engagement convex portions 17g and the display member 18 is described later.

The position of the indicator display barrel 16 is fixed with respect to the base portion 12. The indicator display barrel 16 is a barrel member (first barrel) that has a function of a fixed barrel and is part of an exterior member of the lens barrel 10. The indicator display barrel 16 is fixed to the base portion 12 through the fixed barrel 14. The indicator display barrel 16 is arranged at a position that is further to the front side than the operation portion 17a of the rotational operation member 17 in a state in which the rotational operation member 17 is positioned at the first position. An indicator 16a that has the shape of a short straight line that is substantially parallel to the optical axis O is provided on the indicator display barrel 16. The indicator 16a is a member for pointing at the distance scale 18a that is provided on the display member 18 as described later.

A depth-of-field scale 16b is arranged on the indicator display barrel 16 in a substantially symmetrical manner on both sides of the indicator 16a so as to interpose the indicator 16a therebetween. The depth-of-field scale 16b is a scale for displaying a depth of field that corresponds to an F number (diaphragm value) of the optical system member 11. The depth-of-field scale 16b is displayed so that characters representing an F number of the same numeric value form a pair in a manner that interposes the indicator 16a therebetween. The depth-of-field scale 16b includes a plurality of such pairs, and each pair denotes an F number of a different value to the other pairs. Note that, although in the description of the present embodiment a plurality of numeric values (5.6, 11, 22) are displayed, it is sufficient that at least only one pair of numeric values that include the same numeric value is displayed.

The display member 18 that is a second barrel is a substantially cylindrical member that is arranged on the inside of the rotational operation member 17 and is capable of relative rotation around the optical axis O with respect to the base portion 12. In other words, the display member 18 is capable of relative rotation around the optical axis O with respect to the indicator display barrel 16.

As shown in FIG. 3, the distance scale 18a that shows focusing distances of the optical system member 11 is provided on the outer circumferential face of the display member 18. In the distance scale 18a, numeric values that show distances from the minimum focusing distance of the optical system member 11 to infinity are arrayed in the circumferential direction. The numeric value of the distance scale 18a that is pointed at by the indicator 16a changes as a result of the display member 18 being rotated relatively around the optical axis O with respect to the indicator display barrel 16.

The rotational range of the display member 18 around the optical axis O is limited, and the display member 18 can only rotate around the optical axis O within a range in which the distance scale 18a is pointed at by the indicator 16a. That is, by means of a combination between the distance scale 18a and the indicator 16a, the distance scale 18a always displays a numeric value of a distance between the minimum focusing distance of the optical system member 11 and infinity.

Figure 9:
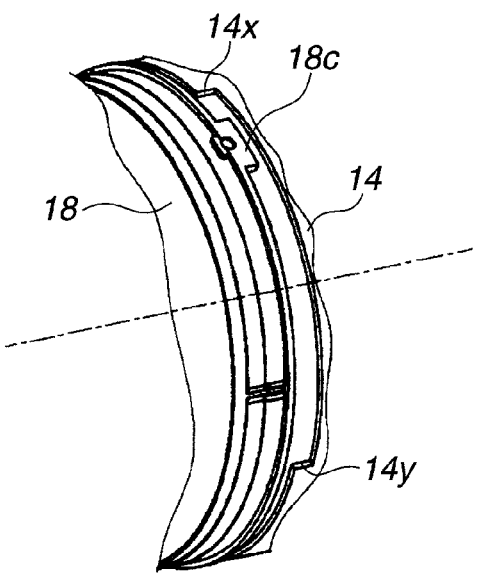
FIG. 9 is an exploded perspective view illustrating a configuration of rotation restriction means.

A configuration that limits the rotational range around the optical axis O of the display member 18 is not particularly limited. As one example according to the present embodiment, as shown in FIG. 9, a convex portion 18c that protrudes rearward is formed at an end portion at the rear of the display member 18, and a first abutting portion (abutting wall) 14x and a second abutting portion (abutting wall) 14y that are arranged so as to hold the convex portion 18c therebetween are formed in the fixed barrel 14 in a manner in which the first and second abutting portions 14x and 14y are separated by a predetermined angle in the circumferential direction. The first abutting portion 14x and the second abutting portion 14y are arranged so as to abut against the convex portion 18c. Consequently, the rotational range around the optical axis O of the display member 18 is limited to a range between the positions at which the convex portion 18c collides with the first abutting portion 14x and the second abutting portion 14y.

Figure 10:
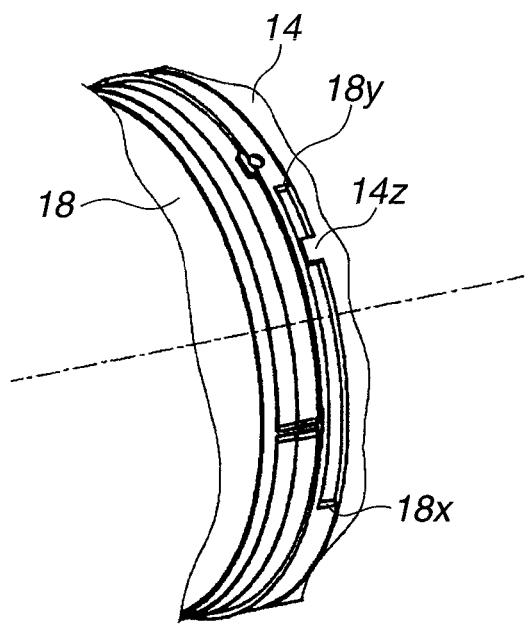
FIG. 10 is an exploded perspective view illustrating another configuration of the rotation restriction means.

Note that a configuration that limits the rotational range around the optical axis O of the display member 18 is not limited to the configuration shown in FIG. 9. For example, as shown in FIG. 10, a configuration may be adopted in which a convex portion 14z is formed in the fixed barrel 14, and a first abutting portion 18x and a second abutting portion 18y that are arranged so as to hold the convex portion 14z therebetween are formed in the display member 18 in a manner in which the first and second abutting portions 18x and 18y are separated by a predetermined angle in the circumferential direction.

That is, rotation restriction means is provided in which a convex portion is provided in one of the fixed barrel 14 or first barrel to which the indicator display barrel 16 is fixed and the display member 18 (second barrel) that is rotatable with respect to the first barrel, and which restricts a range of the relative rotation of the second barrel with respect to the first barrel by interference between the convex portion and the other of the first barrel and the second barrel.

According to the present embodiment, as shown in FIG. 2, when the rotational operation member 17 is positioned at the first position, a state is entered in which the distance scale 18a of the display member 18 can not be seen from outside of the lens barrel 10. In contrast, as shown in FIG. 3, when the rotational operation member 17 is positioned at the second position, a state is entered in which the distance scale 18a of the display member 18 can be seen from outside of the lens barrel 10.

Specifically, the display member 18 is arranged between the operation portion 17a and the inside cylindrical portion 17b of the rotational operation member 17. In other words, a cylindrical portion that is the operation portion 17a of the rotational operation member 17 is arranged at a location that is further on the outer side in the diameter direction than the outer circumferential face of the display member 18. When the rotational operation member 17 is positioned at the first position, the operation portion 17a advances over the distance scale 18a and covers and conceals the distance scale 18a. Further, when the rotational operation member 17 is positioned at the second position, the operation portion 17a withdraws from the position over the distance scale 18a and thus the distance scale 18a is exposed to the outside and displayed. In other words, when the rotational operation member 17 is positioned at the second position, a state is entered in which the display member 18 is exposed to outside.

According to the lens barrel 10 of the present embodiment, the display member 18 is configured so as to rotate around the optical axis O together with the rotational operation member 17 only in a case where the rotational operation member 17 is positioned at the second position. Further, when the rotational operation member 17 is positioned at the first position, the rotational operation member 17 can rotate independently of the display member 18.

Specifically, one engagement pin 18b constituting engagement means is provided so as to protrude to the inner side in the diameter direction on the inner circumferential portion (inner circumferential face) of the display member 18. According to the present embodiment, the engagement pin 18b is a separate member from the display member 18 and is fixed to the display member 18 by press-fitting or an adhesive. Note that the engagement pin 18b may also be integrally formed with the display member 18.

Since the display member 18 is arranged between the operation portion 17a and the inside cylindrical portion 17b of the rotational operation member 17, the engagement pin 18b protrudes in the direction of the inside cylindrical portion 17b that is arranged on the inner side of the display member 18. In other words, the engagement pin 18b of the display member 18 and the engagement convex portions 17g of the rotational operation member 17 protrude in a direction in which they face each other.

The external diameter of the engagement pin 18b is smaller than a clearance between adjacent engagement convex portions 17g, and the engagement pin 18b has a shape that fits in a loose fitting state between adjacent engagement convex portions 17g. In addition, the engagement pin 18b has a cross-sectional shape in which the frontward side when viewed from the inner side in the diameter direction is a substantially V shape.

As shown in FIG. 5 and FIG. 7, when the rotational operation member 17 is positioned at the first position, the engagement pin 18b is arranged at a position that is further on the rear side than the engagement convex portions 17g of the rotational operation member 17 and that is a position such that the engagement pin 18b does not interfere with the engagement convex portions 17g even if the rotational operation member 17 rotates around the optical axis O.

As shown in FIG. 6 and FIG. 8, when the rotational operation member 17 is positioned at the second position, the engagement pin 18b is positioned in the same circumferential direction as the engagement convex portions 17g. In other words, when the rotational operation member 17 is positioned at the second position, the engagement pin 18b is arranged at a position that overlaps with the engagement convex portions 17g in the optical axis O direction. That is, when the rotational operation member 17 moves relatively from the first position to the second position, the engagement pin 18b fits between adjacent engagement convex portions 17g. Conversely, when the rotational operation member 17 moves relatively from the second position to the first position, the fitting state between the engagement pin 18b and the engagement convex portions 17g is released.

By means of the engagement means including the engagement convex portions 17g and the engagement pin 18b having the above described configuration, when the rotational operation member 17 is positioned at the second position, the display member 18 rotates around the optical axis O together with the rotational operation member 17, and when the rotational operation member 17 is positioned at the first position, even if the rotational operation member 17 rotates around the optical axis O, the display member 18 does not rotate and remains stopped.

Note that, as described above, the rearward side of each of the plurality of convex portions of the engagement convex portions 17g has a substantially V shape as viewed from the outer side in the diameter direction, and the frontward side of the engagement pin 18b has a substantially V shape as viewed from the inner side in the diameter direction. Hence, when the rotational operation member 17 moves from the first position to the second position, the display member 18 slightly rotates due to the substantially V-shaped areas provided in the rotational operation member 17 and the display member 18 following each other, and consequently the engagement pin 18b and the engagement convex portions 17g smoothly engage. Therefore, a catching action does not occur when an operation is performed to move the rotational operation member 17 in the optical axis O direction, and movement of the rotational operation member 17 can be rapidly performed.

Further, as described above, the rotational range of the display member 18 is limited to a range in which a combination of the distance scale 18a and the indicator 16a displays a numeric value of a distance between the minimum focusing distance of the optical system member 11 and infinity. Consequently, when the rotational operation member 17 is positioned at the second position and engaged with the display member 18, it is possible for the rotational operation member 17 to rotate only within the same rotational range as the display member 18. That is, when the rotational operation member 17 is positioned at the second position, a limitation is applied to the rotational range of the rotational operation member 17.

As described above, when the rotational operation member 17 is positioned at the second position, the range of rotation of the rotational operation member 17 is also restricted to a predetermined range by the rotation restriction means that restricts the range of the relative rotation of the display member 18 (second barrel) with respect to the fixed first barrel.

On the other hand, when the rotational operation member 17 is positioned at the first position, since the rotational operation member 17 does not interfere with the display member 18, there is no limitation on the rotational range of the rotational operation member 17. That is, when the rotational operation member 17 is positioned at the first position, the rotational operation member 17 can rotate without any limitation, without the range of rotation being restricted by the rotation restriction means.

A second encoder portion 23 (display member rotation detection portion, rotation position detection means) that is second encoder means that detects an absolute rotational position around the optical axis O of the display member 18 with respect to the base portion 12 is also arranged in the lens barrel 10 of the present embodiment.

Figure 11:
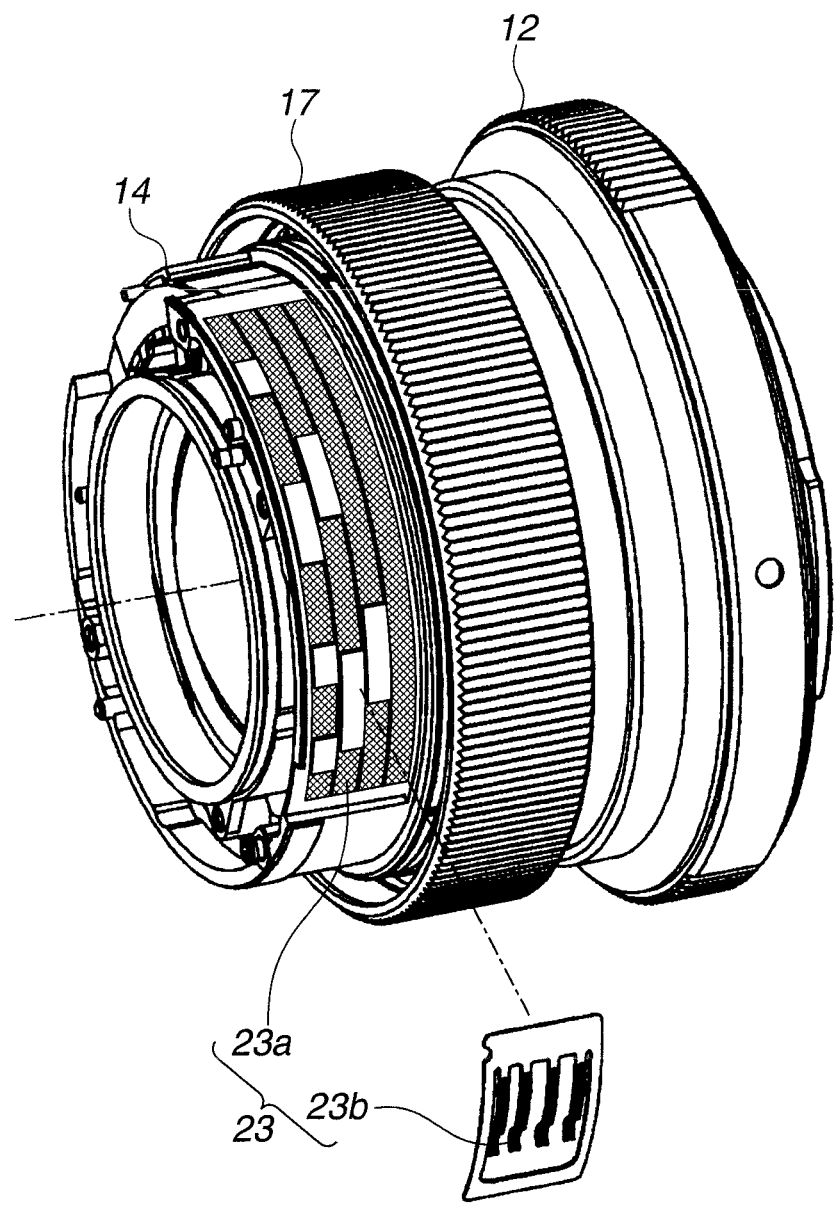
FIG. 11 is a perspective view illustrating a configuration of a second encoder portion.

As shown in FIG. 11, as one example according to the present embodiment, the second encoder portion 23 is configured to have the form of a so-called "absolute rotary encoder". The second encoder portion 23 includes a code pattern 23a of a predetermined number of bits constituted by a conductor, and a contact portion 23b constituted by a conductor that slides over the code pattern 23a.

The code pattern 23a is arranged on the outer circumferential portion of the fixed barrel 14. The contact portion 23b is arranged on the display member 18. The position of the code pattern 23a that the contact portion 23b contacts changes according to the rotational position around the optical axis O of the display member 18. Although not shown in the drawings, the second encoder portion 23 has an electric circuit that detects a state of contact between the code pattern 23a and the contact portion 23b, and the absolute rotational position around the optical axis O of the display member 18 with respect to the base portion 12 can be calculated based on the detection result.

Note that the configuration of the second encoder portion 23 is not limited to the present embodiment as long as a form is adopted that enables detection of an absolute rotational position around the optical axis O with respect to the base portion 12. For example, the second encoder portion 23 may be an optical or magnetic absolute rotary encoder, and a form may also be adopted that has a configuration similar to a so-called "potentiometer", in which a resistance value changes in accordance with the rotational position around the optical axis O of the display member 18.

Figure 12:
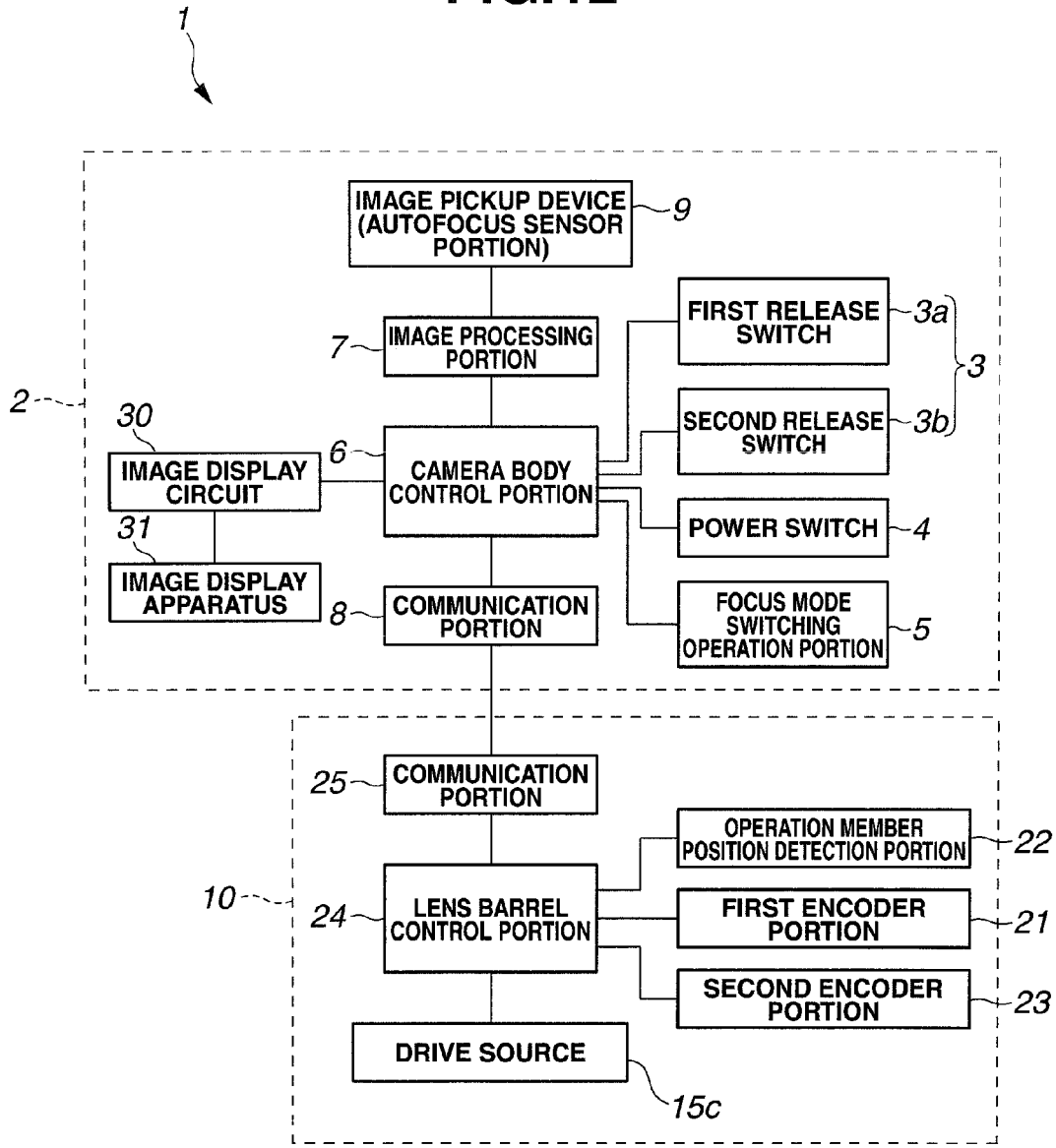
FIG. 12 is a block diagram of an electric circuit of a configuration involved in focusing operations of the camera system.

Next, the electrical configuration of portions involved in focusing operations of the camera system 1 is described referring to FIG. 12.

As described in the foregoing, the release switch 3, the power switch 4, the focus mode switching operation portion 5 and the image pickup device 9 that is an autofocus sensor portion are arranged in the camera body 2. In addition, a camera body control portion 6, an image processing portion 7, a communication portion 8, an image display circuit 30, and an image display apparatus 31 are arranged in the camera body 2.

The camera body control portion (control means) 6 that constitutes a control portion includes a processing apparatus (CPU), a storage apparatus (RAM), an input/output apparatus, a power control apparatus and the like, and controls operations of the camera body 2 based on a predetermined program.

The image processing portion 7 is an electronic circuit portion for performing image processing. The image processing portion 7 can calculate a contrast value of an object image based on a signal that is outputted from the image pickup device 9. Note that a form of implementing the image processing portion 7 in the camera body 2 may be a hardware form in which computational hardware for image processing is mounted in the camera body 2, or may be a software form in which the processing apparatus of the camera body control portion 6 performs image processing based on a predetermined image processing program.

The communication portion 8 is a portion for performing communication with a lens barrel control portion 24 through a communication portion 25 provided in the lens barrel 10 by wire communication or wireless communication. The image processing circuit 30 is a circuit for displaying an object image from the image pickup device 9 on the image display apparatus 31, and for example, displays an object image during a focusing operation on the image display apparatus 31.

As described above, the drive portion 15, the operation member position detection portion 22, the first encoder portion 21 and the second encoder portion 23 are arranged in the lens barrel 10. The lens barrel control portion 24 and the communication portion 25 are also arranged in the lens barrel 10.

The lens barrel control portion (control means) 24 constituting a control portion includes a processing apparatus, a storage apparatus, an input/output apparatus and the like, and controls operations of the lens barrel 10 based on a predetermined program in conjunction with the camera body control portion 6. Further, the communication portion 25 is a portion for performing communication with the camera body control portion 6 through the communication portion 8 provided in the camera body 2 by wire communication or wireless communication.

Next, operations of the camera system 1 that has the above described configuration are described.

Figure 13:
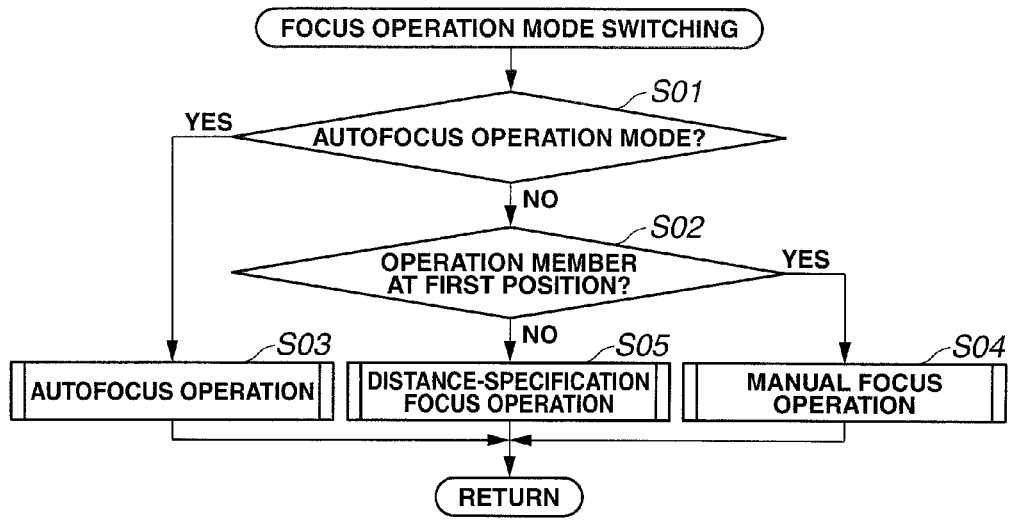
FIG. 13 is a flowchart of a focus operation mode switching subroutine.

In the camera system 1 of the present embodiment, when the camera body is in a state in which the power is turned on, a focus operation mode switching subroutine shown in FIG. 13 is repeatedly performed at a predetermined cycle by the camera body control portion 6. The focus operation mode switching subroutine is a subroutine for judging a focus operation mode that is selected by a user by input of an instruction from among a plurality of focus operation modes of the camera system 1, and switching the focus operation mode of the camera system 1 in accordance with the inputted instruction.

Note that the focus operation mode switching subroutine described hereunder is appropriately incorporated into a main routine for causing the camera system 1 to perform photographing operations. The main routine for causing the camera system 1 to perform photographing operations is the same as known technology, and hence a description thereof is omitted.

According to the focus operation mode switching subroutine, first, in step S01, the camera body control portion 6 judges whether or not a focus operation mode that the user selected through the focus mode switching operation portion 5 is the autofocus operation mode.

If the result of the judgment in step S01 is that the autofocus operation mode is selected, the process shifts to step S03 to switch the operation of the camera system 1 so as to perform an autofocus operation. In step S03, the camera system 1 performs an autofocus operation illustrated in FIG. 14.

Figure 14:
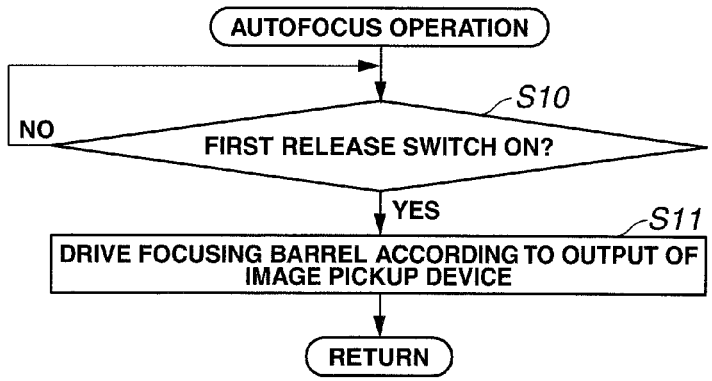
FIG. 14 is a flowchart of an autofocus operation subroutine.

Although the timing at which the camera system 1 performs an autofocus operation is not particularly limited, as one example according to the present embodiment, as shown in the flowchart of FIG. 14, it is assumed that an autofocus operation is performed when the first release switch 3a enters an "on" state.

When the camera system 1 performs an autofocus operation, the camera body control portion 6 detects a contrast value of an object image based on a signal that is outputted from the image pickup device 9 that is an autofocus sensor portion, and drives the focusing barrel 13 so that the contrast value becomes a maximum value.

For example, in the case of the camera system 1 that has a configuration in which the camera body 2 and the lens barrel 10 can be detachably attached to each other as in the present embodiment, at the time of an autofocus operation the camera body control portion 6 issues a command for driving the focusing barrel 13 to perform focusing control based on a signal outputted from the image pickup device 9. In this case, the lens barrel control portion 24 of the lens barrel 10 drives the focusing barrel 13 by means of the drive portion 15 in accordance with the command from the camera body control portion 6 that is inputted through the communication portion 25.

Since the focus operation mode switching subroutine is ended by execution of step S03, according to the camera system 1 of the present embodiment, in a case where the autofocus operation mode is selected, an autofocus operation is performed irrespective of whether the rotational operation member 17 is positioned at the first position or the second position. Accordingly, in an autofocus operation, even when the rotational operation member 17 is positioned at the second position and the distance scale 18a is exposed to outside, the focusing barrel 13 is driven and focusing control is performed irrespective of the numeric value of the distance on the distance scale 18a that the indicator 16a indicates. Further, although in this case a configuration is adopted so that "even when the rotational operation member 17 is positioned at the second position and the distance scale 18a is exposed to outside, the focusing barrel 13 is driven and focusing control is performed irrespective of the numeric value of the distance on the distance scale 18a that the indicator 16a indicates", as a separate embodiment, a configuration may also be adopted so that when the rotational operation member 17 is positioned at the second position and the distance scale 18a is exposed to outside, the focusing barrel 13 is driven to a position that corresponds to the distance on the distance scale 18a that the indicator 16a indicates.

In contrast, if the result of the judgment in step S01 is that the autofocus operation mode is not selected, the process shifts to step S02. In step S02, the camera body control portion 6 judges whether or not the rotational operation member 17 is present at the first position based on an output signal of the operation member position detection portion 22.

If the result of the judgment in step S02 is that the rotational operation member 17 is present at the first position, the process shifts to step S04. In step S04, the operation of the camera system 1 is switched so as to perform a manual focus operation for focusing control.

Figure 15:
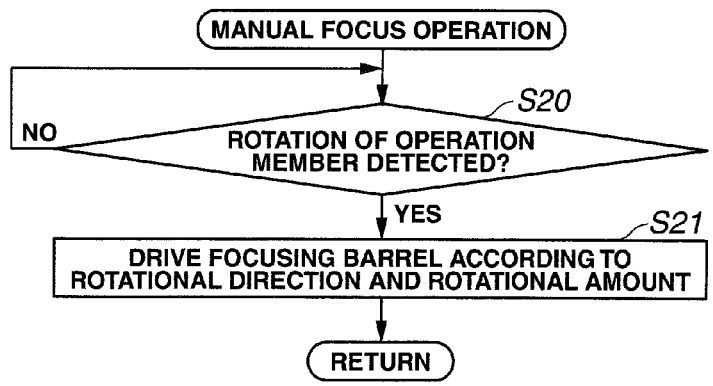
FIG. 15 is a flowchart of a manual focus operation subroutine.

In step S04, the camera system 1 performs a manual focus operation illustrated in FIG. 15. When performing the manual focus operation, if rotation of the rotational operation member 17 is detected by the first encoder portion 21, the camera system 1 drives the focusing barrel 13 in accordance with the rotational direction and the rotational amount of the rotational operation member 17. Note that at the time of a manual focus operation, the user can observe the focusing state by observing the state of an object image displayed on the image display apparatus 31, and the user operates the rotational operation member 17 based on the observation result. Naturally, also at the time of another focusing operation, the user can similarly observe the focusing state by observing the state of an object image displayed on the image display apparatus 31.

For example, in a case where it is detected that the rotational operation member 17 rotated in the clockwise direction when viewing the lens barrel 10 from the rear, the camera system 1 moves the focusing barrel 13 in a direction in which the focusing distance of the optical system member 11 becomes shorter. Further, for example, in a case where it is detected that the rotational operation member 17 rotated in the counterclockwise direction when viewing the lens barrel 10 from the rear, the camera system 1 moves the focusing barrel 13 in a direction in which the focusing distance of the optical system member 11 becomes longer.

The movement distance and speed on the focusing barrel 13 in a manual focus operation is determined in accordance with a rotational amount (rotation angle) and a rotational speed (angular speed of rotation) of the rotational operation member 17 detected by the first encoder portion 21.

The manual focus operation shown in FIG. 15 is repeatedly executed until a focusing operation other than a manual focus operation is selected by execution of the focus operation mode switching subroutine. That is, the manual focus operation shown in FIG. 15 is repeatedly executed until the autofocus operation mode is selected by means of the focus mode switching operation portion 5 or the rotational operation member 17 is moved from the first position to the second position.

In contrast, if the result of the judgment in step S02 is that the rotational operation member 17 is not present at the first position, that is, that the rotational operation member 17 is present at the second position, the process moves to step S05. In step S05, the operation of the camera system 1 is switched so as to perform a distance-specification focus operation for focusing control.

Figure 16:
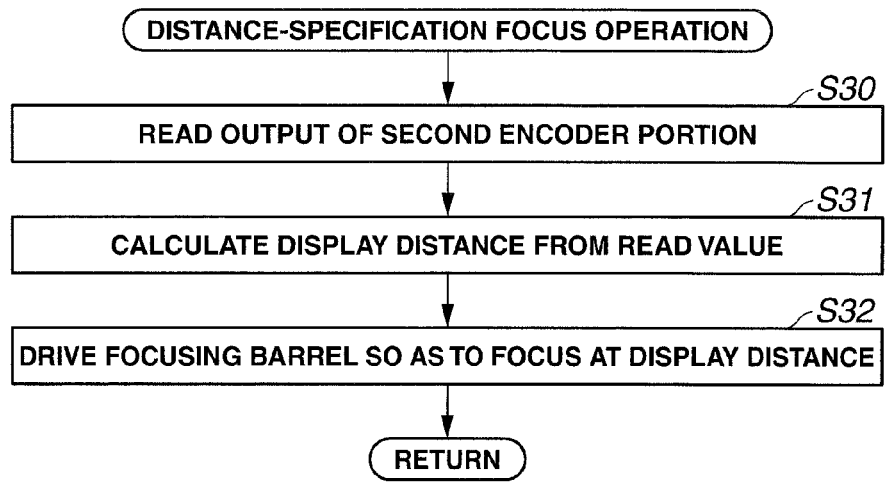
FIG. 16 is a flowchart of a distance-specification focus operation.

In step S05, the camera system 1 performs a distance-specification focus operation illustrated in FIG. 16. When performing the distance-specification focus operation, the camera system 1 drives the focusing barrel 13 to a position that corresponds to a numeric value of a distance on the distance scale 18a that the indicator 16a indicates, the distance scale 18a being calculated based on an output signal from the second encoder portion 23. That is, the focusing barrel 13 is driven by the drive portion 15 to a position that is in accordance with a relative position between the first barrel that is the fixed barrel 14 and indicator display barrel 16 and the second barrel that is the display member 18.

Specifically, in the distance-specification focus operation, first, in step S30, the lens barrel control portion 24 reads an output value of the second encoder portion 23. The output value of the second encoder portion 23 is a value that represents an absolute rotational position around the optical axis O of the display member 18 with respect to the base portion 12.

Next, in step S31, based on the output value of the second encoder portion 23, the lens barrel control portion 24 calculates a numeric value of the distance on the distance scale 18a that the indicator 16a indicates. Conversion to the numeric value of the distance on the distance scale 18a that the indicator 16a indicates on the basis of the output value of the second encoder portion 23 is performed, for example, by the lens barrel control portion 24 based on a conversion table that is previously stored.

Next, in step S32, the lens barrel control portion 24 moves the focusing barrel 13 so that, based on the output value of the second encoder portion 23, the numeric value of the distance on the distance scale 18a that the indicator 16a indicates and a focusing distance of the optical system member 11 match or are in proximity to each other. For example, if the numeric value of the distance on the distance scale 18a that the indicator 16a indicates is 3 meters, the lens barrel control portion 24 moves the focusing barrel 13 so that the focusing distance of the optical system member 11 becomes 3 meters.

Note that, although it is ideal that the numeric value of the distance on the distance scale 18a that the indicator 16a indicates and the focusing distance of the optical system member 11 match, since it is difficult to match the aforementioned numeric value and focusing distance in a case where the resolution of the second encoder portion 23 is low, the focusing barrel 13 is moved so that the numeric value and focusing distance are in proximity to each other.

The lens barrel control portion 24 outputs the calculated numeric value of the distance on the distance scale 18a that the indicator 16a indicates to the camera body control portion 6 of the camera body 2 through the communication portion 25. The camera body control portion 6 determines an exposure value in accordance with the numeric value that is received, and adds the numeric value to a photographed image as metadata.

The distance-specification focus operation shown in FIG. 16 is repeatedly executed until a focusing operation other than the distance-specification focus operation is selected by execution of the focus operation mode switching subroutine. That is, the distance-specification focus operation shown in FIG. 16 is repeatedly executed until the autofocus operation mode is selected by means of the focus mode switching operation portion 5 or the rotational operation member 17 is moved from the second position to the first position.

As described above, the camera system 1 of the present embodiment includes the indicator 16a that is arranged at a fixed position with respect to the base portion 12 that is fixed to the camera body 2, the display member 18 having the distance scale 18a that is arranged so as to be rotatable with respect to the base portion 12, the second encoder portion 23 that detects a rotational position of the display member 18 with respect to the base portion 12, and the rotational operation member 17 that rotates together with the display member 18.

At the time of an autofocus operation, the camera system 1 of the present embodiment performs focusing control based on an output of the image pickup device 9 that is a focusing sensor portion, regardless of the rotational position of the display member 18. Further, at the time of a distance-specification focus operation, the camera system 1 drives the focusing barrel 13 to a position that corresponds to a numeric value of a distance on the distance scale 18a that the indicator 16a indicates, the distance scale 18a being calculated based on an output signal of the second encoder portion 23. That is, in the camera system 1, manual focusing the distance scale is possible. Further, the user can switch between an autofocus operation and a distance-specification focus operation in the camera system 1 by operating the focus mode switching operation portion 5 and the rotational operation member 17.

According to the lens barrel 10 of the camera system 1 having the above described configuration, the only member that the drive portion 15 drives is the focusing barrel 13 that holds the focusing lens 11a, and thus the camera system 1 can be provided in which the number of members driven by the drive portion 15 is decreased and which is lightweight. Thus, according to the present embodiment, the drive portion 15 can be made a small member with a small output, and the lens barrel 10 can be miniaturized. Further, focus operations can be performed rapidly.

In addition, according to the present embodiment, a mechanism that transmits a motive force for driving the display member 18 is not required, and a motive force can be transmitted from the drive portion 15 to the focusing barrel 13 as a member to be driven with a simple configuration that has few component parts. Consequently, it is easy to reduce the volume of sound generated when driving the focusing barrel 13 to perform focusing control. Suppressing the sound volume generated at a time of focusing control is preferable, for example, when shooting a moving image.

Further, according to the present embodiment, in a case where the manual focus operation mode is selected by the focus mode switching operation portion 5 and the rotational operation member 17 is positioned at the second position, manual focus using the distance scale is possible. Therefore, according to the present embodiment, a photographing technique can be executed in which the focusing distance is previously set manually to a predetermined focusing distance using the distance scale 18a and photographing is performed rapidly without performing a focusing control operation.

For example, according to the present embodiment, because the depth-of-field scale 16b is provided on the indicator display barrel 16, a user can immediately confirm a focusing object distance by looking at the distance scale 18a, the indicator 16a and the depth-of-field scale 16b that are exposed on the outer circumferential portion of the lens barrel 10.

On the other hand, according to the present embodiment, in a case where the manual focus operation mode is selected by means of the focus mode switching operation portion 5 and the rotational operation member 17 is positioned at the first position, it is possible to perform manual focusing as illustrated in FIG. 15 in which focusing control is performed in accordance with rotation of the rotational operation member 17. In the manual focus operation, since the rotational operation member 17 is not engaged with the display member 18, the rotational operation member 17 can rotate without limitation around the optical axis O, and focusing control of the optical system member 11 is performed in accordance with the rotational amount of the rotational operation member 17.

Therefore, in a manual focus operation of the camera system 1 of the present embodiment, focusing control can be performed that is finer than in a distance-specification focus operation using the distance scale.

As described above, according to the camera system 1 of the present embodiment it is possible to selectively execute a distance-specification focus operation in which rapid photographing is realized as a result of the focusing distance and the depth of field being clearly indicated by means of the indicator 16a and the distance scale 18a as rough focusing control (coarse control) through the drive portion 15, and a manual focus operation that performs fine focusing control (fine control) through the drive portion 15 according to the rotational amount of the rotational operation member 17. Further, since it is possible to switch between a distance-specification focus operation and a manual focus operation by merely moving the rotational operation member 17 back and forth, the switching can be executed rapidly and explicitly.

Note that fine focusing control of course can also be performed even in a distance-specification focus operation if the resolution of the second encoder portion 23 is sufficiently high. Further, a distance-specification focus operation may be referred to as an "absolute focus operation" and a manual focus operation may be referred to as a "relative focus operation".

Furthermore, according to the present embodiment, in a case where the rotational operation member 17 is positioned at the first position, since the rotational operation member 17 and the display member 18 are not engaged, the display member 18 does not rotate even if the rotational operation member 17 rotates. Therefore, a focusing distance that has been set at the time of a distance-specification focus operation is not changed at the time of a manual focus operation.

For example, after the user rotates the display member 18 so that the focusing distance becomes 3 meters at the time of a distance-specification focus operation, even if the rotational operation member 17 is moved to the first position and focusing control by a manual focus operation is performed, the display member 18 does not rotate. Hence, in a case where, thereafter, the user moves the rotational operation member 17 to the second position to perform a distance-specification focus operation, the focusing distance of the optical system member 11 returns to 3 meters. Accordingly, by previously setting the focusing distance to a value that is desired at the time of a distance-specification focus operation, photographing with a desired focusing distance can be quickly performed by merely moving the rotational operation member 17 rearward from a state in which a manual focus operation is being performed.

As described above, according to the present embodiment it is possible to perform autofocusing and manual focusing the distance scale, and a small camera system as well as a lens barrel that is used in the camera system can be realized.

Second Embodiment

Hereunder, a second embodiment of the present invention is described. In the following, only differences with respect to the first embodiment are described, and components that are the same as in the first embodiment are denoted by the same reference symbols and descriptions of such components are appropriately omitted.

Figure 17:
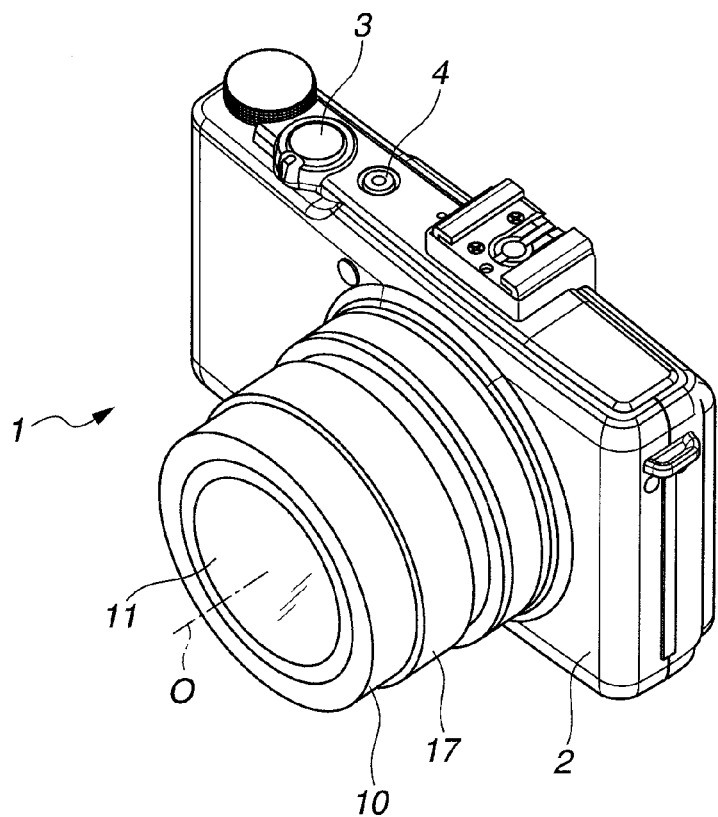
FIG. 17 is a perspective view showing a front face side of a camera constituting a camera system according to a second embodiment.

As shown in FIG. 17, the camera system 1 of the present embodiment includes the camera body 2 and the lens barrel 10 that are integrally formed and can not be detached and attached with respect to each other. In the camera system 1 in which the camera body 2 and the lens barrel 10 are integrated into a single body as in the present embodiment, it is not necessary to arrange a control portion in each of the camera body 2 and the lens barrel 10, and a configuration can be adopted that includes only a single rotational direction and rotational amount control portion.

Figure 18:
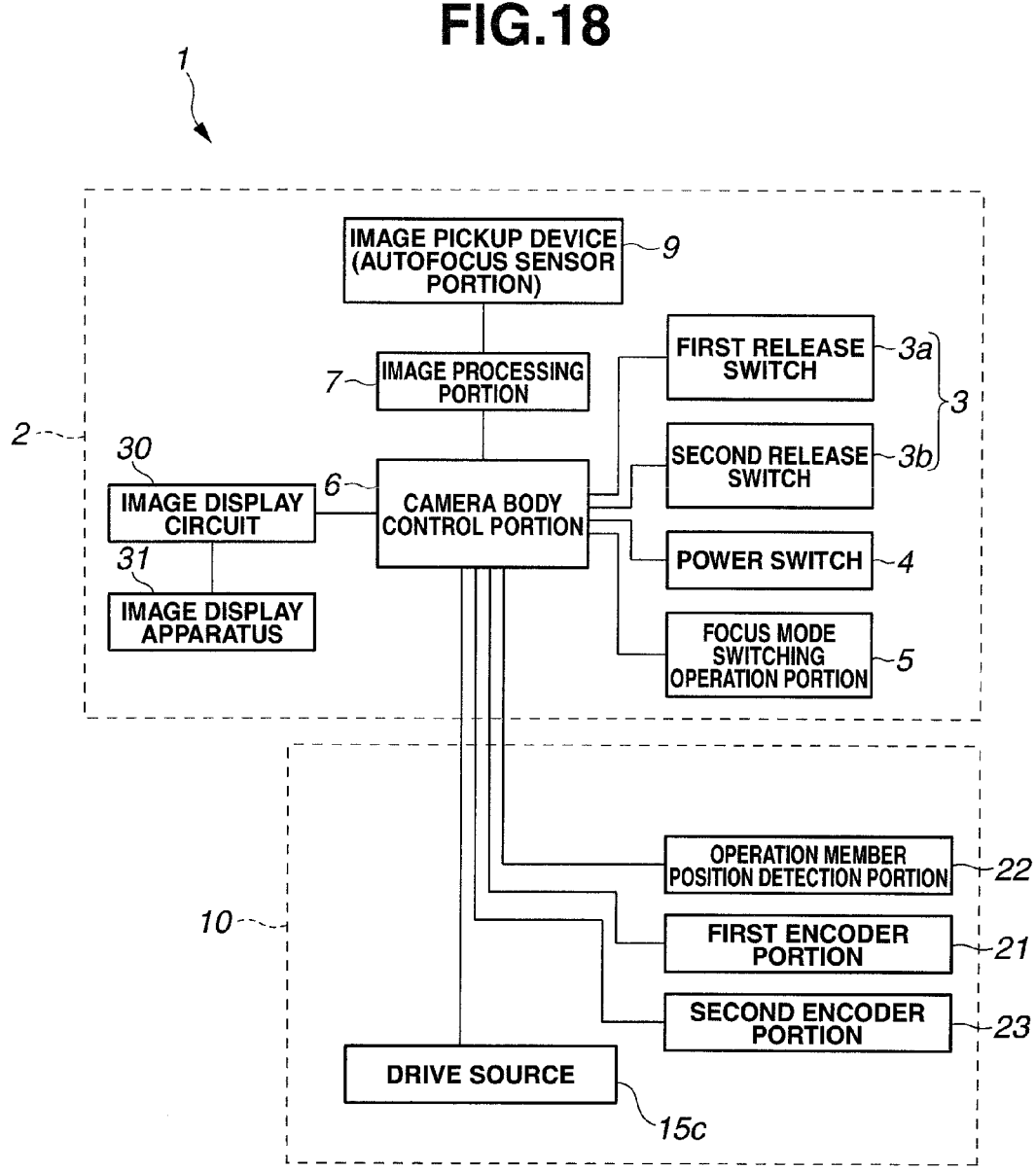
FIG. 18 is a block diagram of an electric circuit of a configuration involved in focusing operations of the camera system of the second embodiment.

As shown in FIG. 18, the only control portion provided according to the present embodiment is the camera body control portion 6 that is arranged inside the camera body 2. The camera body control portion 6 is configured to be capable of additionally executing the control that the lens barrel control portion performs in the first embodiment. The remaining configuration and operations of the camera system 1 of the present embodiment are the same as in the first embodiment. Accordingly, the camera system 1 of the present embodiment can obtain similar advantageous effects as those of the first embodiment.

Third Embodiment

Hereunder, a third embodiment of the present invention is described. The third embodiment differs from the first embodiment only with respect to the form of engagement between the rotational operation member 17 and the display member 18. In the following, only differences with respect to the first embodiment are described, and components that are the same as in the first embodiment are denoted by the same reference symbols and descriptions of such components are appropriately omitted.

Figure 19:
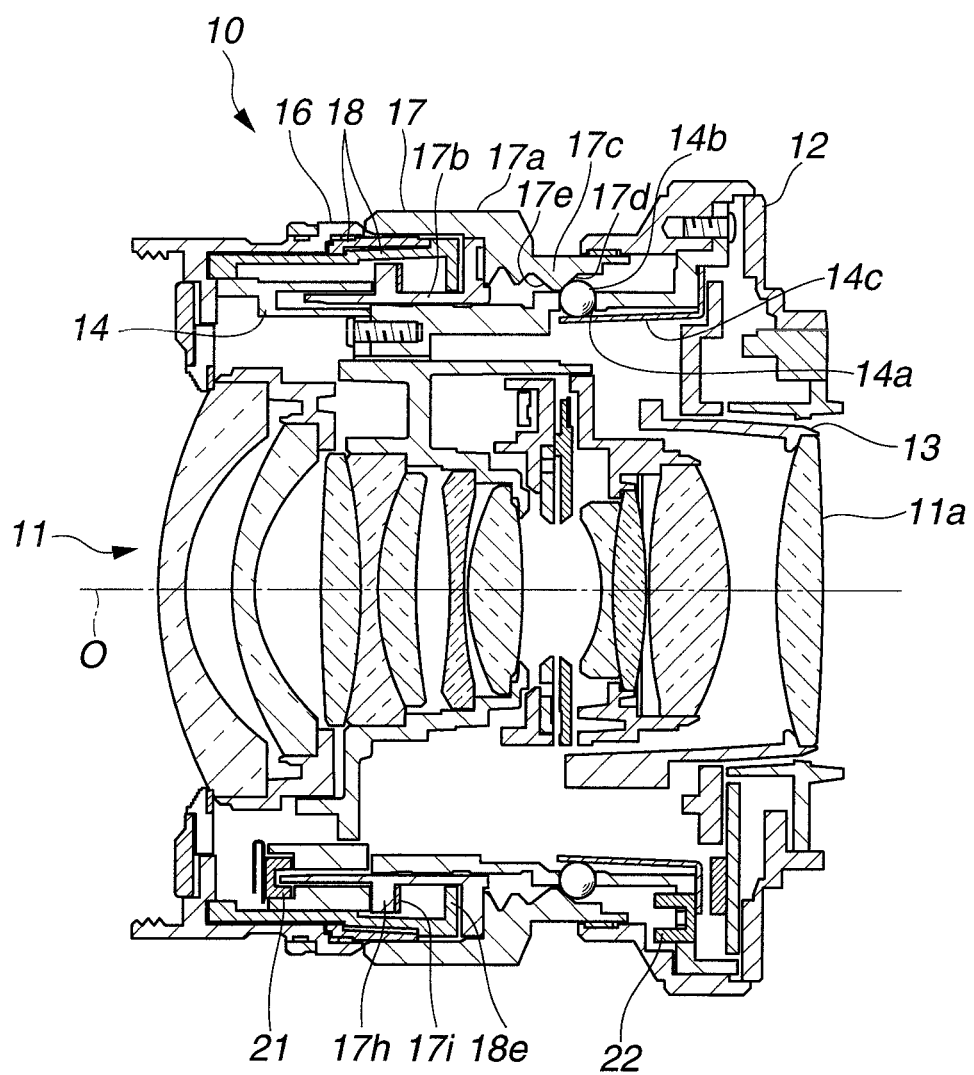
FIG. 19 is a cross-sectional view of a lens barrel in a state where a rotational operation member is positioned at a first position according to a third embodiment.
Figure 20:
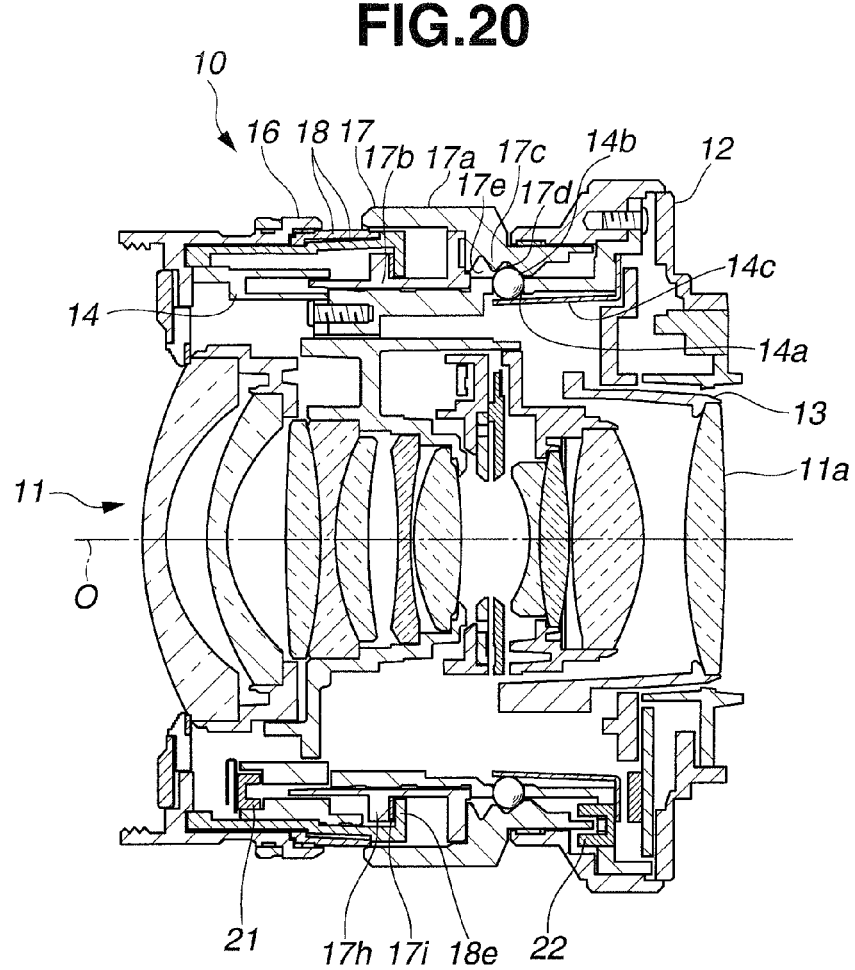
FIG. 20 is a cross-sectional view of the lens barrel in a state where the rotational operation member is positioned at a second position according to the third embodiment.

FIG. 19 is a cross-sectional view of the lens barrel 10 in a state where the rotational operation member 17 is positioned at the first position and the rotational operation member 17 and the display member 18 are not engaged. FIG. 20 is a cross-sectional view of the lens barrel 10 in a state where the rotational operation member 17 is positioned at the second position and the rotational operation member 17 and the display member 18 are engaged.

According to the present embodiment, engagement between the rotational operation member 17 and the display member 18 is performed by means of friction between the two members.

Specifically, in a state where the rotational operation member 17 is positioned at the second position, the rotational operation member 17 is urged relatively rearward with respect to the display member 18 by the urging member 14c and the ball 14b. According to the present embodiment, a configuration is adopted so that friction force is generated between the rotational operation member 17 and the display member 18 by pressing the rotational operation member 17 against the display member 18 by means of the aforementioned urging force, and consequently the rotational operation member 17 and the display member 18 rotate together.

More specifically, according to the present embodiment, a flange portion 17h that protrudes to the outer side in the diameter direction is provided on the outer circumferential portion of the inside cylindrical portion 17b of the rotational operation member 17. On the other hand, in the display member 18 that is arranged on the outer circumference of the inside cylindrical portion 17b, a flange portion 18e is provided that protrudes to the inner side in the diameter direction at a position that is further to the rear than the flange portion 17h.

The flange portion 17h and the flange portion 18e are arranged at positions that face each other in a separated state in the optical axis O direction when the rotational operation member 17 is positioned at the first position, and that abut when the rotational operation member 17 is positioned at the second position.

According to this configuration, in the present embodiment, when the rotational operation member 17 is positioned at the second position, the rotational operation member 17 and the display member 18 engage by means of friction between the flange portion 17h and the flange portion 18e.

Note that preferably a member or surface treatment that raises a frictional coefficient between the flange portion 17h and the flange portion 18e is provided on at least one of the faces of the flange portion 17h and the flange portion 18e that face each other. As one example according to the present embodiment, a high friction material 17i is attached onto a face that faces towards the rear side of the flange portion 17h. The high friction material 17i is constituted, for example, by a resin material such as rubber, and is a member in which a frictional coefficient with respect to the flange portion 18e is higher than that of the flange portion 17h. In addition, for example, the high friction material 17i may be a material in which microscopic protrusions are provided that are made of cemented carbide on stainless steel.

According to the present embodiment, by using friction to cause the rotational operation member 17 and the display member 18 to engage, the amount by which the rotational position of the display member 18 changes when the rotational operation member 17 is moved between the first position and the second position can be suppressed.

The remaining configuration and operations of the camera system 1 of the present embodiment are the same as in the first embodiment or the second embodiment. Accordingly, the camera system of the present embodiment can obtain similar advantageous effects as those of the first embodiment or the second embodiment.

Fourth Embodiment

Hereunder, a fourth embodiment of the present invention is described. The fourth embodiment differs from the third embodiment only with respect to the form of engagement between the rotational operation member 17 and the display member 18. In the following, only differences with respect to the third embodiment are described, and components that are the same as in the third embodiment are denoted by the same reference symbols and descriptions of such components are appropriately omitted.

Figure 21:
FIG. 21 is a partial enlarged cross-sectional view of a lens barrel in a state where a rotational operation member is positioned at a first position according to a fourth embodiment.
Figure 21:
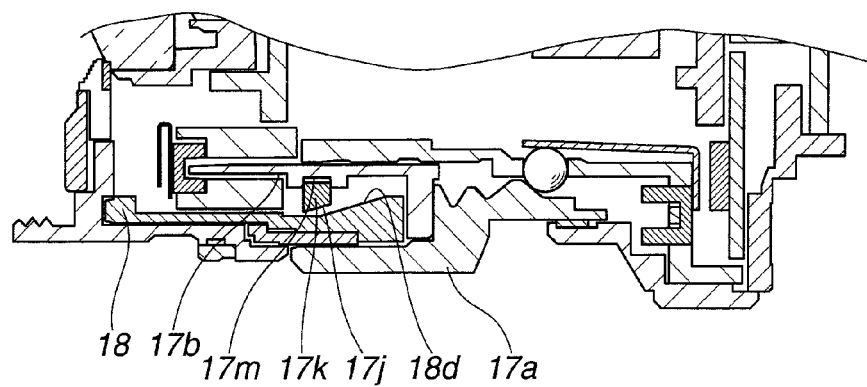
Figure 22:
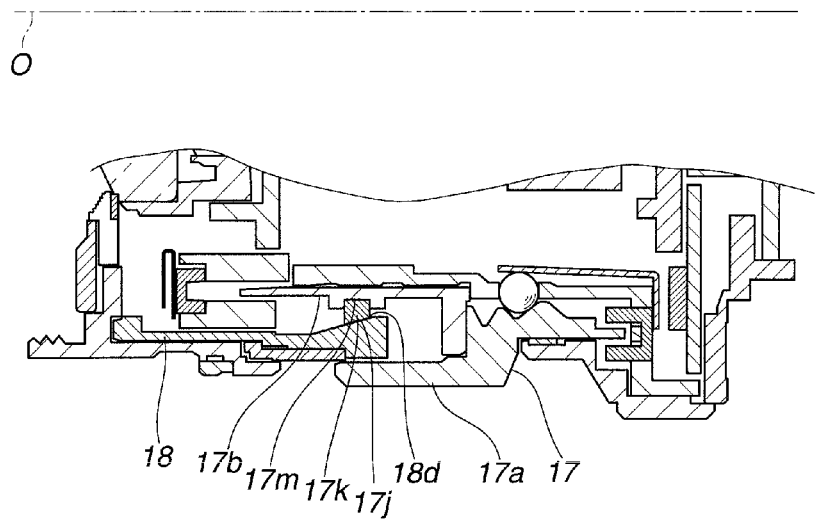
FIG. 22 is a partial enlarged cross-sectional view of the lens barrel in a state where the rotational operation member is positioned at a second position according to the fourth embodiment.

FIG. 21 is a partial cross-sectional view of the lens barrel 10 in a state where the rotational operation member 17 is positioned at the first position and the rotational operation member 17 and the display member 18 are not engaged. FIG. 22 is a partial cross-sectional view of the lens barrel 10 in a state where the rotational operation member 17 is positioned at the second position and the rotational operation member 17 and the display member 18 are engaged.

According to the present embodiment, similarly to the third embodiment, a configuration is adopted so that, in a state where the rotational operation member 17 is positioned at the second position, by pressing the rotational operation member 17 against the display member 18 by means of an urging force that urges the rotational operation member 17 rearward, a frictional force is generated between the rotational operation member 17 and the display member 18, and consequently the rotational operation member 17 and the display member 18 rotate together.

According to the present embodiment, a groove portion 17m is carved in the circumferential direction in an outer circumferential portion of the inside cylindrical portion 17b of the rotational operation member 17. A C-shaped ring 17k is fitted into the groove portion 17m so as to surround the optical axis O. The C-shaped ring 17k is a substantially C-shaped member having a form in which a part of an annular ring has been notched. The C-shaped ring 17k has an inner diameter that fits together with a bottom face of the groove portion 17m with a predetermined clearance therebetween. A tapered portion 17j is provided in the outer circumferential portion of the C-shaped ring 17k. The outer diameter of the tapered portion 17j decreases in the rearward direction in a state in which the C-shaped ring 17k is fitted in the groove portion 17m.

On the other hand, in an inner circumferential portion of the display member 18, a tapered portion 18d whose inner diameter decreases in the rearward direction is provided at a position that is further to the rear than the C-shaped ring 17k. The tapered portion 17j of the C-shaped ring 17k and the tapered portion 18d of the display member 18 are arranged so as to face each other in a separated state in the optical axis O direction when the rotational operation member 17 is positioned at the first position, and so as to abut against each other when the rotational operation member 17 is positioned at the second position.

By means of this configuration, according to the present embodiment, when the rotational operation member 17 is positioned at the second position, since the C-shaped ring 17k is urged rearward in a state in which the tapered portion 17j and tapered portion 18d abut against each other, the C-shaped ring 17k is compressed towards the inner side in the diameter direction so that the inner diameter thereof decreases. Further, the shape of the inner circumferential face of the C-shaped ring 17k is changed to the direction of the bottom face of the groove portion 17m by elasticity.

Therefore, according to the present embodiment, the rotational operation member 17 and the display member 18 engage by means of friction between the tapered portion 17j and the tapered portion 18d and friction between the inner circumferential face of the C-shaped ring 17k and the bottom face of the groove portion 17m. According to the present embodiment, a contact area for contact between the tapered portions is large and a strong fastening force is obtained. Furthermore, since a part in the circumferential direction of the C-shaped ring 17k is notched, release of fastening can be performed with ease. Note that the configuration may also be one in which, to restrict relative rotation of the C-shaped ring 17k with respect to the inside cylindrical portion 17b, a key is provided in one of the C-shaped ring 17k and the inside cylindrical portion 17b, and a key groove that engages with the key is provided in the other of the C-shaped ring 17k and the inside cylindrical portion 17b.

According to the present embodiment, by engaging the rotational operation member 17 and the display member 18 by means of friction therebetween, the amount by which the rotational position of the display member 18 changes when the rotational operation member 17 is moved between the first position and the second position can be suppressed.

The remaining configuration and operations of the camera system 1 of the present embodiment are the same as in the first embodiment or the second embodiment. Accordingly, the camera system 1 of the present embodiment can obtain similar advantageous effects as those of the first embodiment or the second embodiment.

Fifth Embodiment

Hereunder, a fifth embodiment of the present invention is described. The fifth embodiment differs from the first embodiment only with respect to the focus operation mode switching subroutine. In the following, only differences with respect to the first embodiment are described, and components that are the same as in the first embodiment are denoted by the same reference symbols and descriptions of such components are appropriately omitted.

Figure 23:
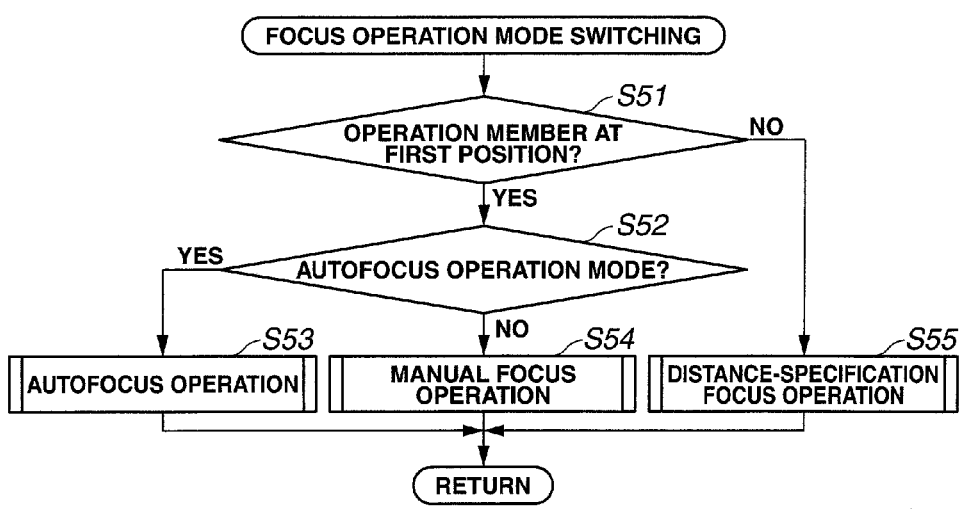
FIG. 23 is a flowchart of a focus operation mode switching subroutine of a camera system according to a fifth embodiment.

FIG. 23 is a flowchart of a focus operation mode switching subroutine of the camera system according to the fifth embodiment. Note that the focus operation mode switching subroutine described hereunder is appropriately incorporated into a main routine for causing the camera system 1 to perform photographing operations. The main routine for causing the camera system 1 to perform photographing operations is the same as known technology, and hence a description thereof is omitted.

According to the present embodiment, first, in step S51, it is judged whether or not the rotational operation member 17 is present at the first position based on an output signal of the operation member position detection portion 22.

If the result of the judgment in step S51 is that the rotational operation member 17 is not present at the first position, the process shifts to step S55, and the operation of the camera system 1 is switched so as to perform a distance-specification focus operation as shown in FIG. 16.

In contrast, if the result of the judgment in step S51 is that the rotational operation member 17 is present at the first position, the process shifts to step S52. In step S52, it is judged whether or not the focus operation mode that the user selected through the focus mode switching operation portion 5 is the autofocus operation mode.

If the result of the judgment in step S52 is that the autofocus operation mode is selected, the process shifts to step S53, and the operation of the camera system 1 is switched so as to perform an autofocus operation. In contrast, if the result of the judgment in step S52 is that the autofocus operation mode has not been selected, the operation of the camera system 1 is switched so as to perform a manual focus operation as shown in FIG. 15.

As described above, according to the focus operation mode switching subroutine of the present embodiment, first, a judgment is made to determine which position among the first position and the second position the rotational operation member 17 is positioned at. Consequently, if the rotational operation member 17 is positioned at the second position, the focus operation mode switching subroutine ends by execution of step S55.

Therefore, according to the camera system 1 of the present embodiment, regardless of whether a focus operation mode that is selected by the user through the focus mode switching operation portion 5 is the autofocus operation mode or the manual focus operation mode, if the rotational operation member 17 is positioned at the second position a distance-specification focus operation is performed.

That is, according to the present embodiment, when the user moves the rotational operation member 17 to the second position, the camera system 1 always executes a distance-specification focus operation. Therefore, according to the present embodiment, it is possible to immediately switch from a state in which an autofocus operation is being performed to a distance-specification focus operation that uses the distance scale.

Further, as described in the above embodiments, when the rotational operation member 17 is positioned at the first position, the rotational operation member 17 and the display member 18 are not engaged, and the display member 18 does not rotate even if the rotational operation member 17 rotates. That is, a focusing distance that was set at the time of a distance-specification focus operation does not change at the time of a manual focus operation.

For example, if the focusing distance is set to 3 meters when the rotational operation member 17 is positioned at the second position, and thereafter the rotational operation member 17 is temporarily moved to the first position and subsequently returned to the second position, the focusing distance remains 3 meters irrespective of whether or not the rotational operation member 17 was rotated and whether or not an autofocus operation was performed at the first position.

Therefore, in a case where the rotational operation member 17 is positioned at the second position, based on the display of the depth-of-field scale 16b, if the focusing distance is set in advance so that a photographing technique that is referred to as a so-called "pan-focus" can be performed, it is possible to rapidly switch from a state in which an autofocus operation or a manual focus operation is being performed to a state of performing pan-focus photographing by merely moving the rotational operation member 17 to the second position. Thus, the convenience for the user is enhanced. Conversely, it is also possible to rapidly switch from a state in which pan-focus photographing is being performed at the time of a distance-specification focus operation to a state of performing an autofocus operation or a manual focus operation by merely moving the rotational operation member 17 to the first position.

The configuration other than the above described focus operation mode switching subroutine of the present embodiment is the same as in the first embodiment. Accordingly, the camera system of the present embodiment can obtain similar advantageous effects as those of the first to fourth embodiments that are described above. That is, as described in the foregoing embodiments, the number of members driven by the drive portion 15 can be reduced and the camera system can be made lightweight. Thus, according to the present embodiment, the drive portion 15 can be made a small member with a small output, and the lens barrel 10 can be miniaturized. Further, focus operations can be rapidly performed.

Figure 24:
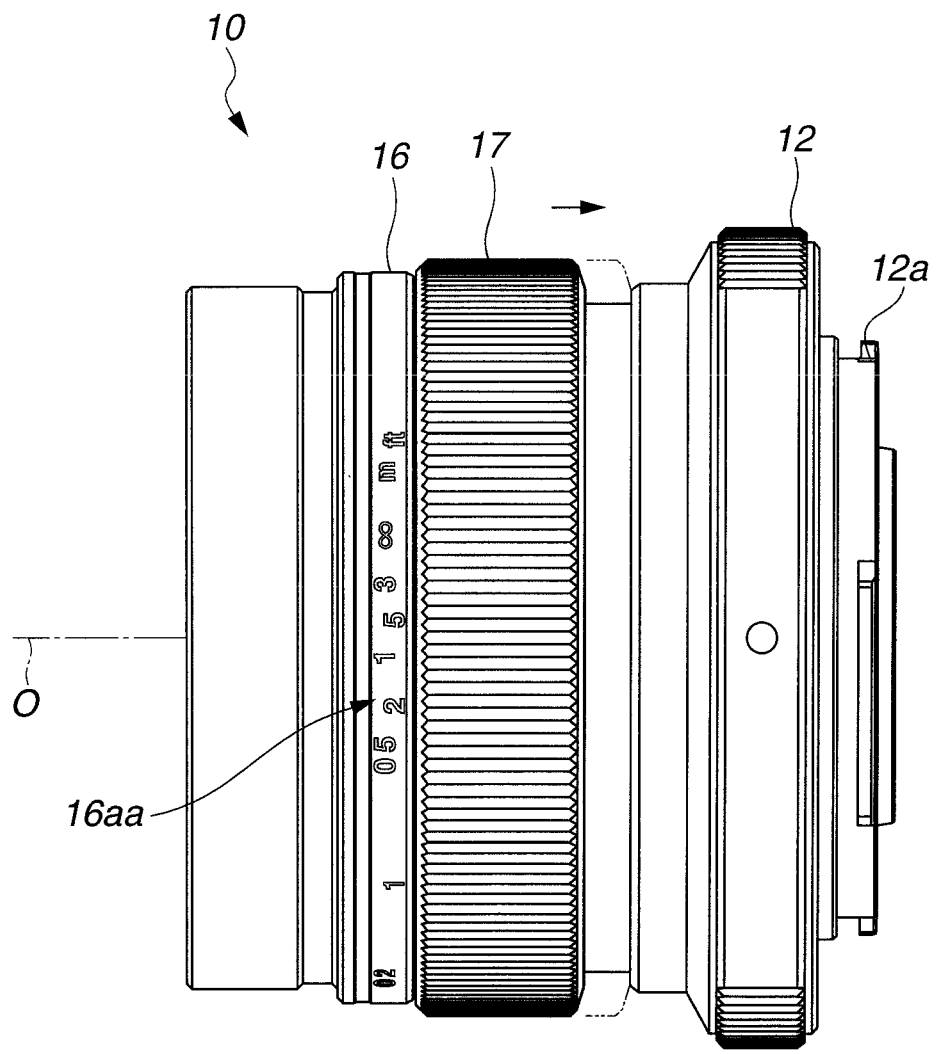
FIG. 24 is a view illustrating another form of display means that includes an indicator and a distance scale.
Figure 25:
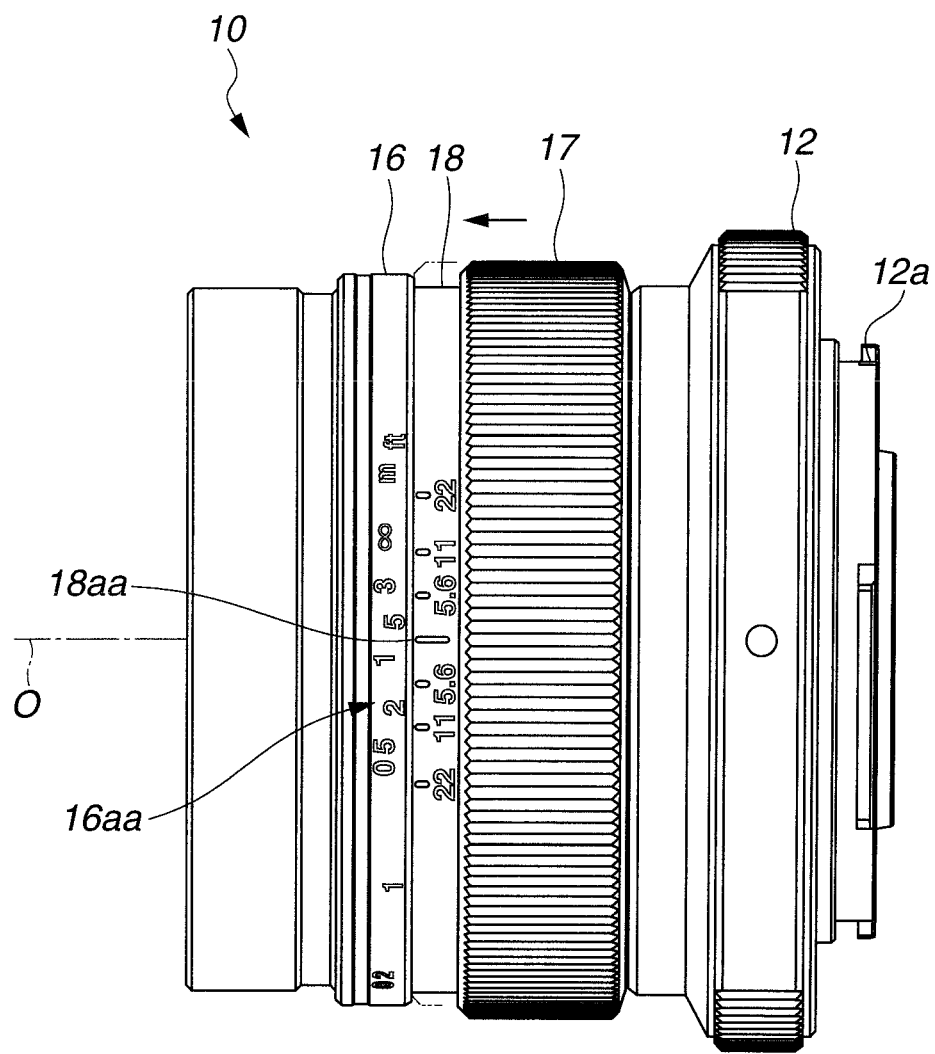
FIG. 25 is a view illustrating another form of display means that includes an indicator and a distance scale.

Note that, although in the above described embodiments the indicator 16a is provided on the indicator display barrel 16 as a first barrel that is fixed, and the distance scale 18a is provided on the display member 18 as a second barrel that is rotatable, the present invention is not limited to this form. For example, as shown in FIG. 24 and FIG. 25, a form may also be adopted in which a distance scale 16aa is provided on the fixed first barrel (denoted by reference numeral 16) and an indicator 18aa is provided on the rotatable second barrel (denoted by reference numeral 18). FIG. 24 illustrates a state in which the rotational operation member 17 is positioned at the first position and a display of diaphragm values cannot be seen. FIG. 25 illustrates a state in which the rotational operation member 17 is positioned at the second position and the display of diaphragm values can be seen. That is, the first barrel that is fixed includes one of the indicator and the distance scale, and the second barrel that is rotatable displays the other of the indicator and the distance scale. In the case of this form also, the lens barrel and the camera system have exactly the same functions as in the above described embodiments. Note that it may be said that a display function that includes a member in which an indicator is provided and a member on which a distance scale is provided is display means.

Note that the present invention is not limited to the above described embodiments, but may be suitably changed without departing from the spirit or concept of the invention readable from the appended claims and the entire specification, and a camera system and a lens barrel with such changes are also included in the technical scope of the present invention.

What is claimed is:

1. A lens barrel, comprising:
    a first barrel;
    a second barrel that is capable of relative rotation around an optical axis with respect to the first barrel;
    a drive source;
    a focusing lens;
    a drive portion that is driven by the drive source, and that drives the focusing lens in an optical axis direction;
    a rotational operation member that is a member operated for driving the focusing lens in the optical axis direction, and that can move in the optical axis direction to a first position at which the rotational operation member covers the second barrel and to a second position at which the rotational operation member causes the second barrel to be exposed to outside, and which is configured to be capable of rotation around the optical axis at the first position and the second position, respectively; and
    engagement means that, when the rotational operation member is at the second position, causes the second barrel and the rotational operation member to engage with each other and rotates the second barrel accompanying rotation of the rotational operation member, and when the rotational operation member is at the first position, disengages the second barrel and the rotational operation member from each other;
    wherein when the rotational operation member is at the first position, the drive portion drives the focusing lens in accordance with rotation of the rotational operation member, and when the rotational operation member is at the second position, the drive portion drives the focusing lens in accordance with rotation of the second barrel that is engaged with the rotational operation member.

2. The lens barrel according to claim 1, further comprising:
    rotation restriction means configured so as to restrict relative rotation of the second barrel with respect to the first barrel to a predetermined range;
    wherein when the rotational operation member is at the first position, the rotational operation member is not subjected to rotational restriction because the rotational operation member is not engaged with the second barrel, and when the rotational operation member is at the second position, because the rotational operation member is engaged with the second barrel, rotation of the rotational operation member around the optical axis is restricted to the predetermined range by the rotation restriction means.

3. The lens barrel according to claim 2, further comprising:
a first encoder portion configured so as to detect a rotational amount and a rotational speed of the rotational operation member when the rotational operation member is at the first position;
a second encoder portion configured so as to detect a rotational position of the second barrel when the rotational operation member is at the second position; and
an operation member position detection portion configured so as to detect a position in the optical axis direction of the rotational operation member;
wherein when the rotational operation member is at the first position, the focusing lens is driven by the drive portion to an arbitrary position in the optical axis direction in accordance with an output of the first encoder portion, and when the rotational operation member is at the second position, the focusing lens is driven by the drive portion in accordance with an output of the second encoder portion.

4. The lens barrel according to claim 3, wherein one of an indicator and a distance scale is displayed on an outer circumferential face of the first barrel, and the other of the indicator and the distance scale is displayed on an outer circumferential face of the second barrel.

5. The lens barrel according to claim 2, wherein one of an indicator and a distance scale is displayed on an outer circumferential face of the first barrel, and the other of the indicator and the distance scale is displayed on an outer circumferential face of the second barrel.

6. The lens barrel according to claim 1, further comprising:
a first encoder portion configured so as to detect a rotational amount and a rotational speed of the rotational operation member when the rotational operation member is at the first position;
a second encoder portion configured so as to detect a rotational position of the second barrel when the rotational operation member is at the second position; and
an operation member position detection portion configured so as to detect a position in the optical axis direction of the rotational operation member;
wherein when the rotational operation member is at the first position, the focusing lens is driven by the drive portion to an arbitrary position in the optical axis direction in accordance with an output of the first encoder portion, and when the rotational operation member is at the second position, the focusing lens is driven by the drive portion in accordance with an output of the second encoder portion.

7. The lens barrel according to claim 6, wherein one of an indicator and a distance scale is displayed on an outer circumferential face of the first barrel, and the other of the indicator and the distance scale is displayed on an outer circumferential face of the second barrel.

8. The lens barrel according to claim 1, wherein one of an indicator and a distance scale is displayed on an outer circumferential face of the first barrel, and the other of the indicator and the distance scale is displayed on an outer circumferential face of the second barrel.

9. The lens barrel according to claim 8, wherein the indicator is displayed in a manner in which the indicator is interposed between at least one pair of diaphragm values displaying a depth of field of an identical numeric value.

10. A camera system, comprising:
a first barrel;
a second barrel that is capable of relative rotation around an optical axis with respect to the first barrel;
a drive source;
a focusing lens;
a drive portion that is driven by the drive source, and that drives the focusing lens in an optical axis direction;
a rotational operation member that is a member operated for driving the focusing lens in the optical axis direction, and that can move in the optical axis direction to a first position at which the rotational operation member covers the second barrel and to a second position at which the rotational operation member causes the second barrel to be exposed to outside, and which is configured to be capable of rotation around the optical axis at the first position and the second position, respectively; and
engagement means that, when the rotational operation member is at the second position, causes the second barrel and the rotational operation member to engage with each other and rotates the second barrel accompanying rotation of the rotational operation member, and when the rotational operation member is at the first position, disengages the second barrel and the rotational operation member from each other;
wherein, when the rotational operation member is at the first position, the drive portion drives the focusing lens in accordance with rotation of the rotational operation member, and when the rotational operation member is at the second position, the drive portion drives the focusing lens in accordance with rotation of the second barrel that is engaged with the rotational operation member.

11. The camera system according to claim 10, further comprising:
rotation restriction means configured so as to restrict relative rotation of the second barrel with respect to the first barrel to a predetermined range;
wherein when the rotational operation member is at the first position, the rotational operation member is not subjected to rotational restriction because the rotational operation member is not engaged with the second barrel, and when the rotational operation member is at the second position, because the rotational operation member is engaged with the second barrel, rotation of the rotational operation member around the optical axis is restricted to the predetermined range by the rotation restriction means.

12. The camera system according to claim 11, further comprising:
a first encoder portion configured so as to detect a rotational amount and a rotational speed of the rotational operation member when the rotational operation member is at the first position;
a second encoder portion configured so as to detect a rotational position of the second barrel when the rotational operation member is at the second position;
an operation member position detection portion configured so as to detect a position in the optical axis direction of the rotational operation member; and
a control portion configured so as to drive the focusing lens to an arbitrary position in the optical axis direction by means of the drive portion in accordance with an output of the first encoder portion when the rotational operation member is at the first position, and to drive the focusing lens by means of the drive portion in accordance with an output of the second encoder portion when the rotational operation member is at the second position.

13. The camera system according to claim 12, wherein one of an indicator and a distance scale is displayed on an outer circumferential face of the first barrel, and the other of the indicator and the distance scale is displayed on an outer circumferential face of the second barrel.

14. The camera system according to claim 11, wherein one of an indicator and a distance scale is displayed on an outer circumferential face of the first barrel, and the other of the indicator and the distance scale is displayed on an outer circumferential face of the second barrel.

15. The camera system according to claim 10, further comprising:
- a first encoder portion configured so as to detect a rotational amount and a rotational speed of the rotational operation member when the rotational operation member is at the first position;
- a second encoder portion configured so as to detect a rotational position of the second barrel when the rotational operation member is at the second position;
- an operation member position detection portion configured so as to detect a position in the optical axis direction of the rotational operation member; and
- a control portion configured so as to drive the focusing lens to an arbitrary position in the optical axis direction by means of the drive portion in accordance with an output of the first encoder portion when the rotational operation member is at the first position, and to drive the focusing lens by means of the drive portion in accordance with an output of the second encoder portion when the rotational operation member is at the second position.

16. The camera system according to claim 15, wherein one of an indicator and a distance scale is displayed on an outer circumferential face of the first barrel, and the other of the indicator and the distance scale is displayed on an outer circumferential face of the second barrel.

17. The camera system according to claim 10, wherein one of an indicator and a distance scale is displayed on an outer circumferential face of the first barrel, and the other of the indicator and the distance scale is displayed on an outer circumferential face of the second barrel.

18. The camera system according to claim 17, wherein the indicator is displayed in a manner in which the indicator is interposed between at least one pair of diaphragm values displaying a depth of field of an identical numeric value.

\* \* \* \* \*